United States Patent
Jaffel et al.

(10) Patent No.: US 12,521,907 B2
(45) Date of Patent: Jan. 13, 2026

(54) APPARATUS AND METHOD FOR THE PRODUCTION OF A PLASTER SLURRY

(71) Applicant: SAINT-GOBAIN PLACO, Courbevoie (FR)

(72) Inventors: Hamouda Jaffel, Vajours (FR); Richard Morlat, Vajours (FR); Andrea Ranzani Da Costa, Vajours (FR)

(73) Assignee: Saint-Gobain Placo, Courbevoie (FR)

( * ) Notice: Subject to any disclaimer, the term of this patent is extended or adjusted under 35 U.S.C. 154(b) by 749 days.

(21) Appl. No.: 17/641,902

(22) PCT Filed: Dec. 9, 2020

(86) PCT No.: PCT/EP2020/085361
§ 371 (c)(1),
(2) Date: Mar. 10, 2022

(87) PCT Pub. No.: WO2021/116221
PCT Pub. Date: Jun. 17, 2021

(65) Prior Publication Data
US 2022/0324138 A1   Oct. 13, 2022

(30) Foreign Application Priority Data

Dec. 10, 2019 (EP) ..................................... 19306622

(51) Int. Cl.
*B28C 5/38* (2006.01)
*B28C 5/02* (2006.01)
(Continued)

(52) U.S. Cl.
CPC ................ *B28C 5/388* (2013.01); *B28C 5/02* (2013.01); *B28C 7/024* (2013.01); *C04B 11/00* (2013.01);
(Continued)

(58) Field of Classification Search
CPC .... B01F 15/0266; B01F 7/26; B01F 15/0233; B01F 15/0276; B01F 15/0292;
(Continued)

(56) References Cited

U.S. PATENT DOCUMENTS 7,690,834 B2 * 4/2010 Nakamura .............. B28C 5/386
366/181.7
2007/0008815 A1 1/2007 Nakamura et al.
(Continued)

FOREIGN PATENT DOCUMENTS

AU  2018 219 975    3/2019
AU  2018219975 A1 * 3/2019
(Continued)

OTHER PUBLICATIONS

International Search Report (ISR) with Written Opinion for PCT/EP2020/085361 dated Feb. 12, 2021, pp. 1-14.

*Primary Examiner* — Charles Cooley
(74) *Attorney, Agent, or Firm* — McDonnell Boehnen Hulbert & Berghoff LLP

(57) ABSTRACT

An apparatus (100) for the production of a plaster slurry is described, the apparatus (100) comprising a mixer (102) for mixing at least plaster and water to form a plaster slurry, the mixer (102) comprising an outlet conduit (122), a foam generator (106) for mixing at least air, a foaming agent and water to produce a foam, the foam generator (106) in fluid communication with the mixer (102) via a fluid pathway (116) comprising a foam conduit (117); and a mass flow meter (124), wherein the mass flow meter (124) is configured to measure the density and mass flow rate of the foam within the foam conduit (117) or the plaster slurry within the outlet conduit (122). Additionally, a method of manufacturing a plaster slurry is described.

21 Claims, 11 Drawing Sheets

(51) Int. Cl.
*B28C 7/02* (2006.01)
*C04B 11/00* (2006.01)
*C04B 38/10* (2006.01)
*G01F 1/84* (2006.01)
*G01N 11/04* (2006.01)

(52) U.S. Cl.
CPC ............ *C04B 38/10* (2013.01); *G01F 1/8477* (2013.01); *G01N 11/04* (2013.01)

(58) Field of Classification Search
CPC .... B01F 15/0293; B01F 7/00766; B01F 3/12; B01F 23/235; B01F 35/21111; B01F 35/2134; B01F 35/83; C04B 11/00; C04B 38/10; C04B 2111/40; C04B 28/14; B28C 5/0881; B28C 5/1253; B28C 5/16; B28C 5/1269; B28C 5/006; B28C 5/06; B28C 5/388; B28C 5/02; B28C 7/024; B28C 5/386; B28B 1/50; B28B 17/023; G01F 1/8477; G01N 11/04; Y02W 30/91
USPC ........ 366/64, 96–99, 162.1, 6, 8, 18, 20, 35, 366/38, 51, 65, 102, 141, 168.1, 171.1, 366/172.1, 172.2, 181.7, 303–304, 366/315–317, 167.1–175.3, 183.2, 366/150.1–182.4; 156/39, 44
See application file for complete search history.

(56) References Cited

U.S. PATENT DOCUMENTS

| | | | | |
|---|---|---|---|---|
| 2010/0039884 A1* | 2/2010 | Weathers | ............ | G05D 11/006 366/152.2 |
| 2014/0043932 A1* | 2/2014 | Russell | .................... | C10L 3/10 366/182.4 |
| 2022/0324138 A1* | 10/2022 | Jaffel | .................... | B01F 23/235 |

FOREIGN PATENT DOCUMENTS

| | | | |
|---|---|---|---|
| AU | 2018219975 C1 | * | 11/2024 |
| CN | 1233322 A | | 10/1999 |
| CN | 1894561 A | | 1/2007 |
| CN | 101549193 A | | 10/2009 |
| CN | 1031004064 A | | 5/2013 |
| CN | 103249691 A | | 8/2013 |
| CN | 106 313 324 | | 1/2017 |
| CN | 106457171 A | | 2/2017 |
| CN | 109328183 A | | 2/2019 |
| CN | 109 514 739 | | 3/2019 |
| WO | 1998007009 A1 | | 2/1998 |
| WO | 2008042060 A1 | | 4/2008 |
| WO | 2012092170 A1 | | 7/2012 |
| WO | 2015185700 A1 | | 12/2015 |
| WO | 2017218061 A1 | | 12/2017 |

* cited by examiner

APPARATUS AND METHOD FOR THE PRODUCTION OF A PLASTER SLURRY

CROSS-REFERENCE TO RELATED APPLICATIONS

The present application is a U.S. National Stage application of International Patent Application no. PCT/EP2020/085361, filed Dec. 9, 2020, which claims the benefit of priority of European Patent Application no. 19306622.2, filed Dec. 10, 2019.

FIELD OF THE INVENTION

The present invention relates to an apparatus for the production of a plaster slurry, and more particularly to an apparatus comprising a mass flow meter. The present invention also relates to a method of producing a plaster slurry comprising the measurement of density and mass flow rate.

BACKGROUND TO THE INVENTION

Gypsum (calcium sulphate) is a mineral that is found naturally, but that can also be derived synthetically. Gypsum may exist in a number of forms, depending on the level of hydration of the calcium sulphate compound. That is, gypsum may exist e.g. in the dihydrate form ($CaSO_4 \cdot 2H_2O$), the hemihydrate form (also known as stucco), or the anhydrite form. Gypsum may be converted between its different forms through dehydration (e.g. calcination) or rehydration.

The properties of gypsum make it highly suitable for use in industrial and building plasters and other building products such as gypsum wallboard. It is a plentiful and generally inexpensive raw material which, through successive steps of dehydration and rehydration, can be cast, moulded or otherwise formed to useful shapes. For example, gypsum wallboard, also known as plasterboard or drywall, is formed as a set gypsum core sandwiched between cover sheets typically made of paper or fibreglass mats.

Gypsum is generally prepared for use as plaster by grinding and calcining at relatively low temperature (such as from about 120 to 170° C.), generally at atmospheric pressure. This results in partially dehydrated gypsum, typically in the beta crystalline form of the hemihydrate. The beta hemihydrate may be used as a building or construction material by mixing it with water to form an aqueous stucco slurry, paste or dispersion, and then allowing the slurry to set by re-crystallisation from the aqueous medium. The aqueous stucco slurry, paste or dispersion is also known as gypsum plaster slurry. Alternatives to gypsum plaster include concrete plaster and lime plaster, all of which can form a plaster slurry.

It is well known to use foam in the manufacture of gypsum products from gypsum plasters. The air volume fraction provided by the foam helps to reduce both material costs and the weight of the gypsum product so that shipping and handling of the product is more cost efficient.

Typically, the foam incorporated into a gypsum product is produced in a foam generator supplied with an air feed, a water feed and optionally a surfactant feed. A typical foam generator comprises internal rotating mechanisms to mix the water, air and the surfactant foaming agent thoroughly to produce foam. In some cases, the rotating blade may be equipped with mixing chambers allowing the nucleation of foam bubbles. Such foam generators are known generally as dynamic foam generators and are well known in the art.

Other foam generators comprise a tube filled with a permeable porous medium, such as packed beads of fritted glass or ceramic, with controlled pore space. The foam is then produced by introducing a surfactant foaming agent and air simultaneously into the tube. In this case, the structure of the produced foam is then controlled by regulating the applied back pressure onto the tube. Such foam generators are known as static foam generators and are again well known in the art.

Whatever the method of foam manufacture, it is essential that both the properties of the foam and the rate at which it is incorporated into any gypsum plaster slurry are carefully controlled. Variations in the properties of the foam, or the volumes at which it is introduced, will have concomitant effects on the properties of the resultant gypsum product. Therefore, it is essential to carefully control and monitor the characteristics and introduction of the foam into the plaster slurry to ensure the final plaster product has the desired properties.

At present, the properties of foams introduced to a plaster slurry are monitored and controlled via taking samples of the foam or plaster slurry from the production line before measuring, verifying and testing the samples with offline processes. The offline testing of samples has numerous disadvantages, not least in that it introduces a delay between sample selection and testing. As plaster slurries and plaster products are typically produced in large scale, continuous processes, even a small delay between selecting a sample and obtaining the results of any test can lead to significant volumes of plaster product being produced outside of specification. Additionally, when it is advantageous to determine the properties of either a large number of separate foam feeds, plaster slurries or plaster products simultaneously, obtaining and testing the large number of samples required can prove unduly onerous.

Therefore, at its most general, aspects of the present invention attempt to provide an apparatus and method by which the density and mass flow rate of a foam or plaster slurry can be measured inline during the manufacturing process.

SUMMARY OF THE INVENTION

According to a first aspect of the present claimed invention, there is provided an apparatus for the production of a plaster slurry comprising a mixer for mixing at least plaster and water to form a plaster slurry, the mixer comprising an outlet conduit, the apparatus further comprising a foam generator for mixing at least air, a foaming agent and water to produce a foam, the foam generator in fluid communication with the mixer via a fluid pathway comprising a foam conduit, a mass flow meter, and a control system configured to vary the density of the foam within the foam conduit or the plaster slurry within the outlet conduit; the mass flow meter configured to measure the density and mass flow rate of the foam within the foam conduit or the plaster slurry within the outlet conduit and wherein the apparatus further comprises at least one sensor configured to measure the pressure at the entrance and/or exit of the mass flow meter, and wherein the control system is configured to correct the measured density using at least one sensor measurement.

In this way, there is provided an apparatus for the manufacture of a plaster slurry where the density and mass flow rate of the foam within the foam conduit or the plaster slurry within the outlet can be monitored inline. Such an apparatus is advantageous as it eliminates the delay between sample selection and testing and allows far greater control over the production process. Additionally, the incorporation of inline measurement of both density and mass flow rate allows the frequency of testing to be increased, allowing for the rapid detection of variations in these properties and helping to ensure any products produced from the gypsum slurry have uniform properties.

In one embodiment of the invention, the foam conduit extends between the foam generator and the mixer. More preferably, the apparatus comprises a plurality of foam conduits extending between the foam generator and the mixer. Preferably, the apparatus comprises a foam conduit which splits into a plurality of sub-conduits extending between the foam conduit and the mixer. Preferably, the foam conduit or foam conduits are configured to feed foam directly into the mixer.

In a further embodiment of the invention, the foam conduit extends between the foam generator and the outlet conduit. More preferably, the apparatus comprises a plurality of foam conduits extending between the foam generator and the outlet conduit. Preferably, the apparatus comprises a foam conduit which splits into a plurality of sub-conduits extending between the foam conduit and the outlet conduit. Preferably, the foam conduit or foam conduits are configured to feed foam directly into the outlet conduit.

In another embodiment of the invention, the apparatus comprises a plurality of foam conduits, at least one of the plurality of foam conduits extending between the foam generator and the mixer, and at least one of the plurality of foam conduits extending between the foam generator and the outlet conduit. Preferably the mixer comprises a plurality of outlet conduits. Preferably, the apparatus comprises a foam conduit which splits into a plurality of sub-conduits, at least one of the plurality of sub-conduits extending between the foam conduit and the mixer, and at least one of the plurality of sub-conduits extending between the foam conduit and the outlet conduit. Configuring the apparatus in this manner may be advantageous where it is desirable to produce plaster slurries with two or more different densities from a single mixer.

Preferably, where the foam conduit extends between the foam generator and the outlet conduit the mass flow meter is positioned downstream of the foam conduit. Positioning the mass flow meter downstream of the foam conduit ensures the plaster slurry is well mixed and homogenous before it enters the mass flow meter.

Preferably, the mass flow meter is configured to continuously measure the density and mass flow rate of the foam within the foam conduit or the plaster slurry within the outlet conduit. A mass flow meter configured to continuously measure the density and mass flow rate of the material passing through it may allow the slurry production process to be continuously monitored such that any inconsistencies in the process are highlighted immediately.

Where the mass flow meter is configured to continuously measure the density and mass flow rate of the foam within the foam conduit or the plaster slurry within the outlet conduit, any drift in the density of the plaster slurry or the foam form a desired value may be swiftly identified and corrected. Additionally, continuous measurement allows any abnormal loss and/or leakage from the system to be detected rapidly as the total flow measured by the mass flow meter will be reduced.

Finally, where the mass flow meter is configured to measure the density and mass flow rate of the foam, if the foam conduit contains any abnormal high shear point where the physical properties of the foam may be modified due to foam destabilisation effects, this may be quickly identified as a drift of the measured foam density. Any such rapid detection will ensure a corrective action may be performed immediately to maintain a good foam quality.

The apparatus further comprises a control system configured to vary the density of the foam within the foam conduit. More preferably, the control system comprises a proportional-integral-derivative (PID) controller. The inclusion of a control system within the apparatus is advantageous as it allows the density of the foam to be varied in light of the measurements taken by the mass flow meter. If desired, the presence of a control system within the apparatus may allow the automatic control of the plaster slurry production process.

Preferably, the apparatus further comprises a control system configured to vary the mass flow rate of the foam within the foam conduit. More preferably, the control system comprises a proportional-integral-derivative (PID) controller. The inclusion of a control system within the apparatus is advantageous as it allows the mass flow rate of the foam to be varied in light of the measurements taken by the mass flow meter. If desired, the presence of a control system within the apparatus may allow the automatic control of the plaster slurry production process.

Preferably, the control system is configured to increase the proportion of air within the foam generator and/or decrease the proportion of water within the foam generator if the measured density is above a target density. Preferably, the control system is configured to decrease the proportion of air within the foam generator and/or increase the proportion of water within the foam generator if said measured density is below a target density.

Preferably, the control system is configured to increase the rate of air introduction into the foam generator and/or decrease the rate of water introduction within the foam generator if the measured density is above a target density. Preferably, the control system is configured to decrease the rate of air introduction into the foam generator and/or increase the rate of water introduction within the foam generator if said measured density is below a target density.

Preferably the target density is a density of the foam. Alternatively, the target density is a density of the plaster slurry. Preferably the target density is a single density value. More preferably, the target density is a range of density values. Where the target density is a range of densities, this may provide advantageous as the control system will not react to every minor variation in the density of the material passing through the mass flow meter. Small variations of this kind are commonplace and, usually, innocuous in real-world systems. Therefore, seeking to maintain the density within a range may increase the reliability of the apparatus as a whole without comprising the quality of the product produced.

Where the target density is a density of the plaster slurry, it may be preferable to configure the apparatus to increase the volume of foam added to the plaster slurry if the measured density is above the target density. Where the target density is a density of the plaster slurry, it may be preferable to configure the apparatus to decrease the volume of foam added to the plaster slurry if the measured density is below the target density. Varying the volume of foam added to the plaster slurry in this manner provides a simplified method of varying the density of the plaster slurry while keeping the foam composition constant. Due to the simplicity of this approach, this method of controlling the density of the plaster slurry is generally preferred.

Preferably, the apparatus further comprises at least one sensor configured to measure the temperature of the material entering or exiting the mass flow meter.

The apparatus further comprises at least one sensor configured to measure the pressure at the entrance and or exit of the mass flow meter. Preferably the apparatus comprises a pair of temperature sensors. Preferably the apparatus comprises a pair of pressure sensors.

The control system is configured to correct the measured density using at least one sensor measurement. More preferably, the corrected density is used to calculate the volume flow rate. Still more preferably the control system is configured to correct the measured density using both the temperature and pressure measurements obtained by the sensors. Most preferably, this correction is performed assuming the foam is an ideal gas.

Preferably the mass flow meter is a Coriolis mass flow meter. Preferably, the mass flow meter comprises two parallel resonating channels and a signal converter. Preferably, the mass flow meter has a curved dual tube design. More preferably, the mass flow meter is a Coriolis mass flow meter comprising two parallel resonating channels and signal converter. Alternatively the mass flow meter comprises a single resonating channel.

Preferably, where the mass flow meter is measuring the density of a foam, the mass flow meter comprises two resonating channels. Two resonating channels are preferred when the density of a foam is measured as the use of a dual resonator design has an enhanced sensitivity when dealing with low density materials. More preferably, the mass flow meter is configured to measure densities within the range 20 to 200 g/L, 30 to 180 g/L, 50 to 150 g/L, 70 to 110 g/L or 80 to 100 g/L. Most preferably of all, the mass flow meter is configured to measure densities within the range 100 to 150 g/l.

Preferably, where the mass flow meter is measuring the density of a plaster slurry, the mass flow meter comprises a single resonating channel. At these higher densities (typically between 700 and 1500 g/l) a single resonating channel provides sufficiently accurate density readings and, furthermore, the use of a single resonating channel reduces the possibility of a blockage or build up forming within a resonating channel.

Preferably, the apparatus comprises at least two mass flow meters, a first mass flow meter configured to measure the density and mass flow rate of the foam within the foam conduit and a second mass flow meter configured to measure the density and mass flow rate of the plaster slurry within the outlet conduit. Such an apparatus is advantageous as it allows the density and mass flow rate of both the plaster slurry and the foam to be monitored, and the effect of changes in the foam density and mass flow rate on the mass flow rate and density of the plaster slurry to be determined.

Preferably, the foam generator is in fluid communication with the mixer via a plurality of fluid pathways, each fluid pathway comprising a foam conduit, and the apparatus further comprises at least two mass flow meters, each mass flow meter configured to measure the density and mass flow rate of the foam within a different foam conduit. Such an apparatus is advantageous as it allows the density and mass flow rate of a number of different foams to be monitored, a feature which is particularly useful when multiple foams are incorporated into a plaster slurry at different points to create a plaster product with variable density.

Preferably, the apparatus comprises at least one further mass flow meter, the at least one further mass flow meter configured to measure the density and mass flow rate of the plaster slurry within the outlet conduit.

Preferably, the apparatus comprises a plurality of outlet conduits, the apparatus further comprising at least two mass flow meters, each mass flow meter configured to measure the density and mass flow rate of said plaster slurry within a different outlet conduit. Such an apparatus is advantageous at it allows the density and mass flow rate of a number of different plaster slurries to be monitored, a feature which is particularly useful when plaster slurries are extracted from different points, portions or sections of the mixer to form a plaster product with variable density.

Preferably, the apparatus comprises at least one further mass flow meter, the at least one further mass flow meter configured to measure the density and mass flow rate of the foam within the foam conduit.

Preferably, the apparatus may comprise multiple foam generators. More preferably, these multiple foam generators are used to provide multiple foams. In this manner, separate foam generators may provide different foams to different foam conduits. Where multiple foam generators are used, the foams generators may all be static, all be dynamic, or be a combination of static and dynamic generators.

Preferably, where the foam conduit is split into multiple conduits, the apparatus may comprise flowmeters on each foam conduit. More preferably, these foam flow meters may be provided in combination with valves configured to control the amount of foam flowing through each foam conduit. Most preferably, these flowmeters and valves may form part of a control loop which allows for the flow rate of foam through each foam conduit to be continuously adjusted.

Preferably, the apparatus is an apparatus for manufacturing a gypsum slurry.

According to a second aspect of the present invention, there is provided a method for manufacturing a plaster slurry comprising the steps of; mixing materials comprising at least plaster and water to form a plaster slurry in a mixer comprising a conduit, mixing at least air, a foaming agent and water to produce a foam in a foam generator, the foam generator in fluid communication with the mixer via a fluid pathway comprising a foam conduit, and measuring the density and mass flow rate of the foam within the foam conduit or the gypsum slurry within the outlet conduit using a mass flow meter, measuring the pressure at the entrance and/or exit of the mass flow meter, and correcting the measured density using at least one sensor measurement.

In this way, there is provided a method with all the advantages of the previously described apparatus.

Preferably, the method comprises the further step of varying the mass flow rate or density of foam within the foam conduit. More preferably, the mass flow rate or density of the foam within the foam conduit is varied using a proportional-integral-derivative (PID) controller.

Preferably, the method further comprises increasing the proportion of air within the foam generator or decreasing the proportion of water within the foam generator if the measured density is above a target density.

Preferably, the method further comprises decreasing the proportion of air within the foam generator or increasing the proportion of water within the foam generator if the measured density is below a target density.

Preferably, the method comprises increasing the rate of air introduction into the foam generator or decreasing the rate of water introduction within the foam generator if the measured density is above a target density. Preferably, the method comprises decreasing the rate of air introduction into the foam generator or increasing the rate of water introduction within the foam generator if said measured density is below a target density.

Preferably the target density is a density of the foam. Alternatively, the target density is a density of the plaster slurry. Preferably the target density is a single density value. More preferably, the target density is a range of density values. Preferably, the method further comprises measuring the temperature of the material entering or exiting the mass flow meter.

Where the target density is a density of the plaster slurry, it may be preferable to increase the volume of foam added to the plaster slurry if the measured density is above the target density. Where the target density is a density of the plaster slurry, it may be preferable to decrease the volume of foam added to the plaster slurry if the measured density is below the target density. Varying the volume of foam added to the plaster slurry in this manner provides a simplified method of varying the density of the plaster slurry while keeping the foam composition constant. Due to the simplicity of this approach, this method of controlling the density of the plaster slurry is preferred.

The method comprises correcting the measured density using a measured pressure. Preferably, the method comprises correcting the measured density using a measured temperature. More preferably, the method further comprises using said corrected density to calculate the volume flow rate. Still more preferably, the method comprises correcting the measured density using both the measured temperature and pressure. Most preferably, the correction is performed assuming the foam is an ideal gas.

Preferably, the measured density of the foam within the foam conduit lies within the range 20 to 200 g/l. More preferably, the measured density of the foam within the foam conduit lies within the range 30 to 180 g/L, 50 to 150 g/l, 60 to 130 g/l, 70 to 110 g/l or 80 to 100 g/l.

Preferably, the step of measuring the density and mass flow rate of the foam within the foam conduit or the gypsum slurry within the outlet conduit using a mass flow meter is conducted continuously. Preferably, the step of measuring the density and mass flow rate of the foam within the foam conduit or the gypsum slurry within the outlet conduit using a mass flow meter is conducted automatically at regular intervals.

Preferably, the method is a method of manufacturing a gypsum slurry.

According to a third aspect of the present invention, there is provided a computer implemented method for controlling an apparatus for the production of a plaster slurry according to the present invention.

In an embodiment of the present invention, the computer implemented method may control the apparatus for the production of a plaster slurry to mix materials comprising at least plaster and water to form a plaster slurry in a mixer comprising a conduit, to mix at least air, a foaming agent and water to produce a foam in a foam generator, said foam generator in fluid communication with said mixer via a fluid pathway comprising a foam conduit, and to measure the density and mass flow rate of said foam within said foam conduit or said gypsum slurry within said outlet conduit using a mass flow meter In an embodiment of the present invention, the computer implemented method may control the apparatus for the production of a plaster slurry to vary the mass flow rate or density of foam within the foam conduit.

In another embodiment of the present invention, the computer implemented method may control the apparatus for the production of a plaster slurry to increase the air within the foam generator and/or decreasing the water within the foam generator if said measured density is above a target density.

In yet another embodiment of the present invention, the computer implemented method may control the apparatus for the production of a plaster slurry to decrease the air within said foam generator and/or increasing the water within said foam generator if said measured density is below a target density.

In a further embodiment of the present invention, the computer implemented method may control the apparatus for the production of a plaster slurry to measure the temperature of the material entering or exiting said mass flow meter.

In another embodiment of the present invention, the computer implemented method may control the apparatus for the production of a plaster slurry to measure the pressure at the entrance and or exit of said mass flow meter.

In another embodiment of the present invention, the computer implemented method may control the apparatus for the production of a plaster slurry to correct the measured density using a measured temperature and or pressure.

Preferably, the measured density lies within the range 20 to 200 g/l.

Preferably, the step of measuring the density and mass flow rate of said foam within said foam conduit or said gypsum slurry within said outlet conduit using a mass flow meter is conducted continuously.

According to a forth aspect of the present invention, there is provided a non-transitory computer readable storage medium comprising instruction that, when executed on a computing device, cause the computing device to control an apparatus for the production of a plaster slurry according to the present invention. The computing device may include various hardware and software components that function to control the apparatus according to the present invention. The computing device may comprise a user interface, a processor in communication with a memory, and a communication interface. The processor may function to execute software instructions that can be loaded from the non-transitory computer readable storage medium and stored in the memory. The processor may include a number of processors, a multi-processor core, or some other type of processor, depending on the particular implementation. The memory may be accessible by the processor, thereby enabling the processor to receive and execute instructions stored on the memory. The memory may be, for example, a random access memory (RAM) or any other suitable volatile or non-volatile computer readable storage medium. In addition, the memory may be fixed or removable and may contain one or more components or devices such as a hard drive, a flash memory, a rewritable optical disk, a rewritable magnetic tape, or some combination of the above.

In all embodiments of the apparatus and method, the flowmeter or flowmeters are preferably part of a control loop which enables continuous adjustment of the rate of air introduction into the foam and/or the rate of water introduction into the foam and/or the volume of foam added to the plaster slurry based on the measurements made by the flowmeter or flowmeters.

Embodiments of this invention can be used in apparatus and/or methods to control the density of any foam or plaster slurry used to form a plasterboard. This includes foams and/or plaster slurries used in forming the main slurry used in a plasterboard, and foams and/or plaster slurries used in roller coating slurries and/or edge slurries used in the manufacture of a plasterboard with edges of a different density to the core.

DETAILED DESCRIPTION

Embodiments of the present invention will now be described by way of example only and with reference to the accompanying drawings, in which.

Figure 9:
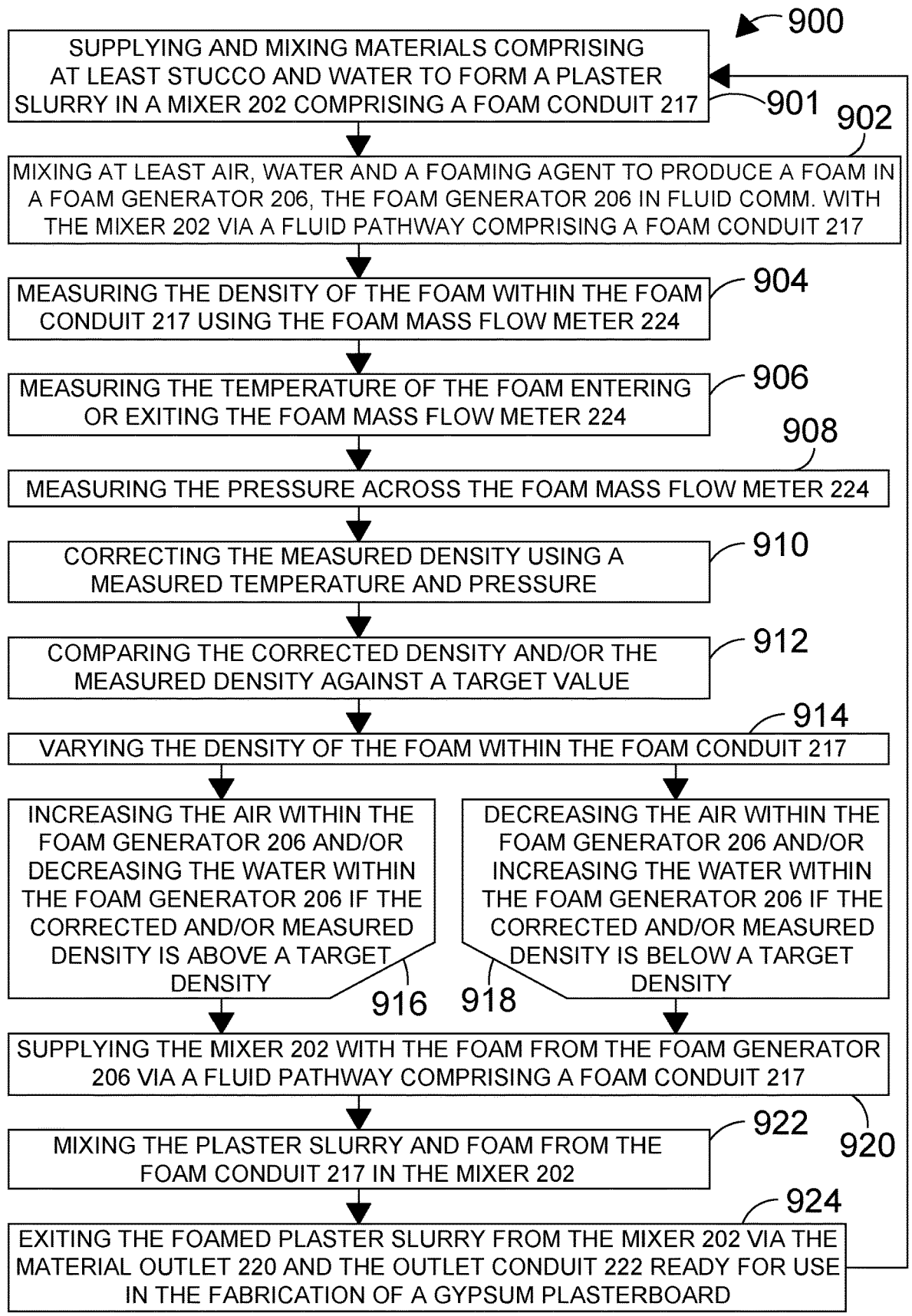
Figure 10:
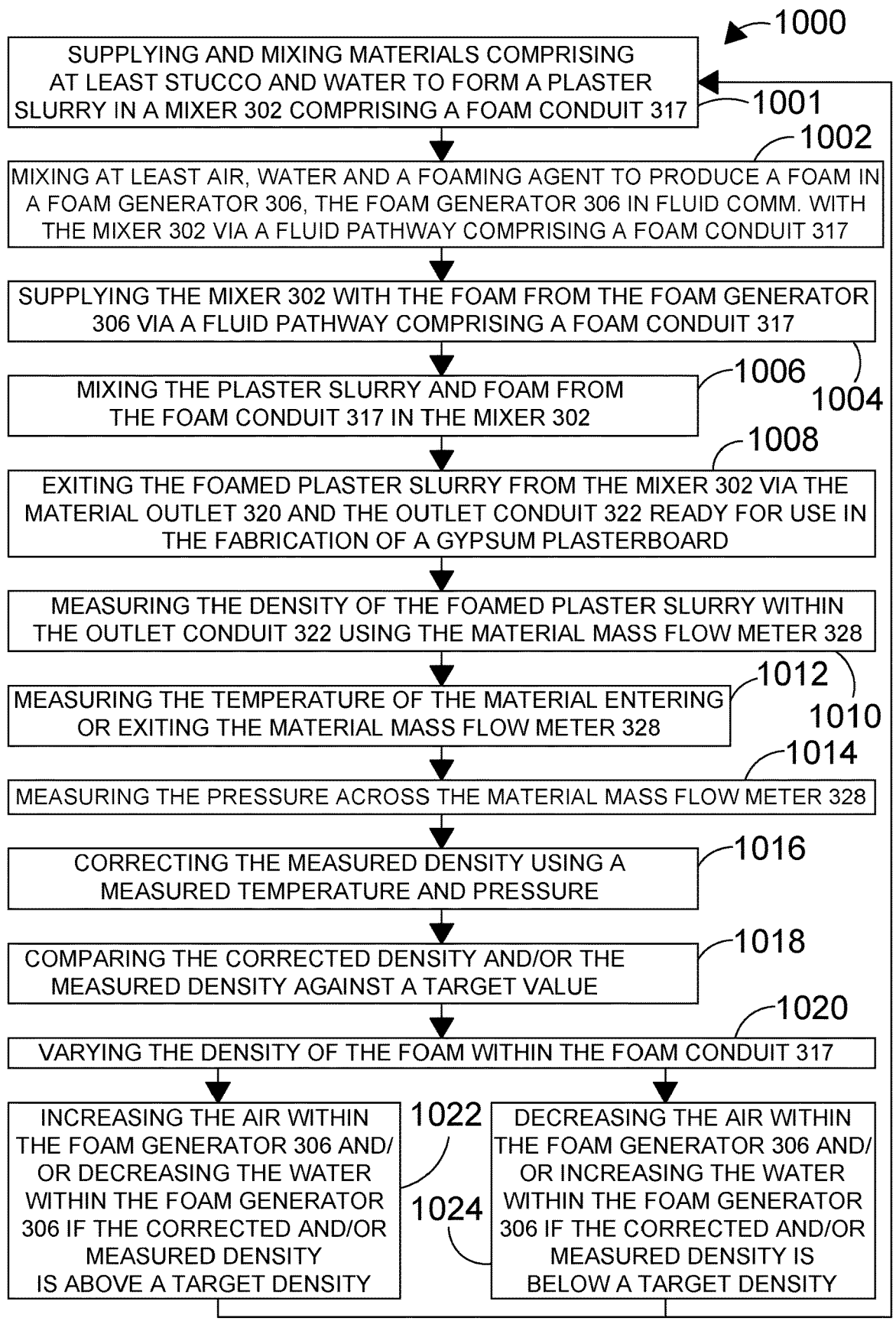
Figure 11:
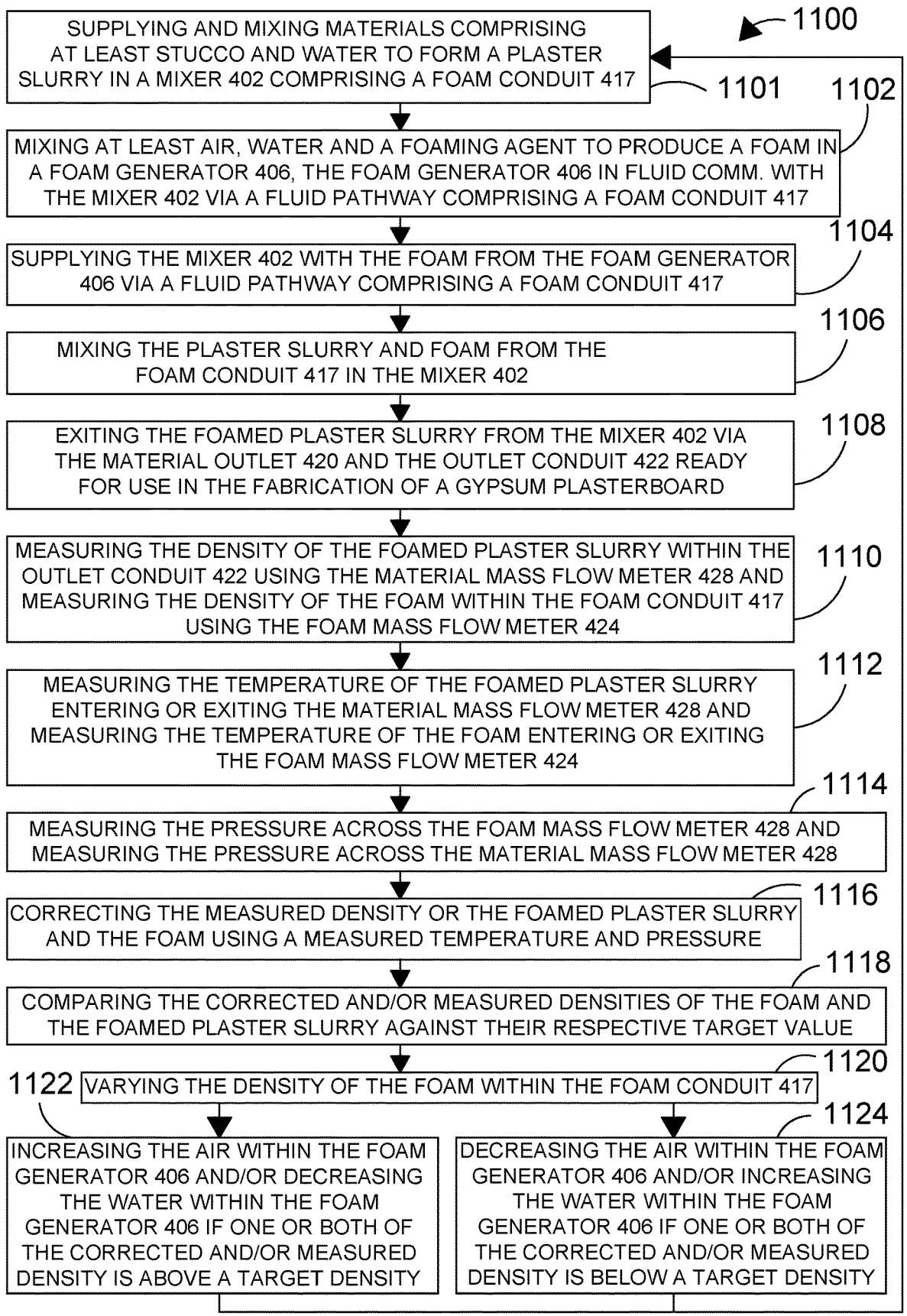

FIG. 9 is a flow chart illustrating a method of using the apparatus of the second embodiment in accordance with a further aspect of the present invention, FIG. 10 is a flow chart illustrating a method of using the apparatus of the third embodiment in accordance with a further aspect of the present invention, and FIG. 11 is a flow chart illustrating a method of using the apparatus of the fourth embodiment in accordance with a further aspect of the present invention.

Figure 1:
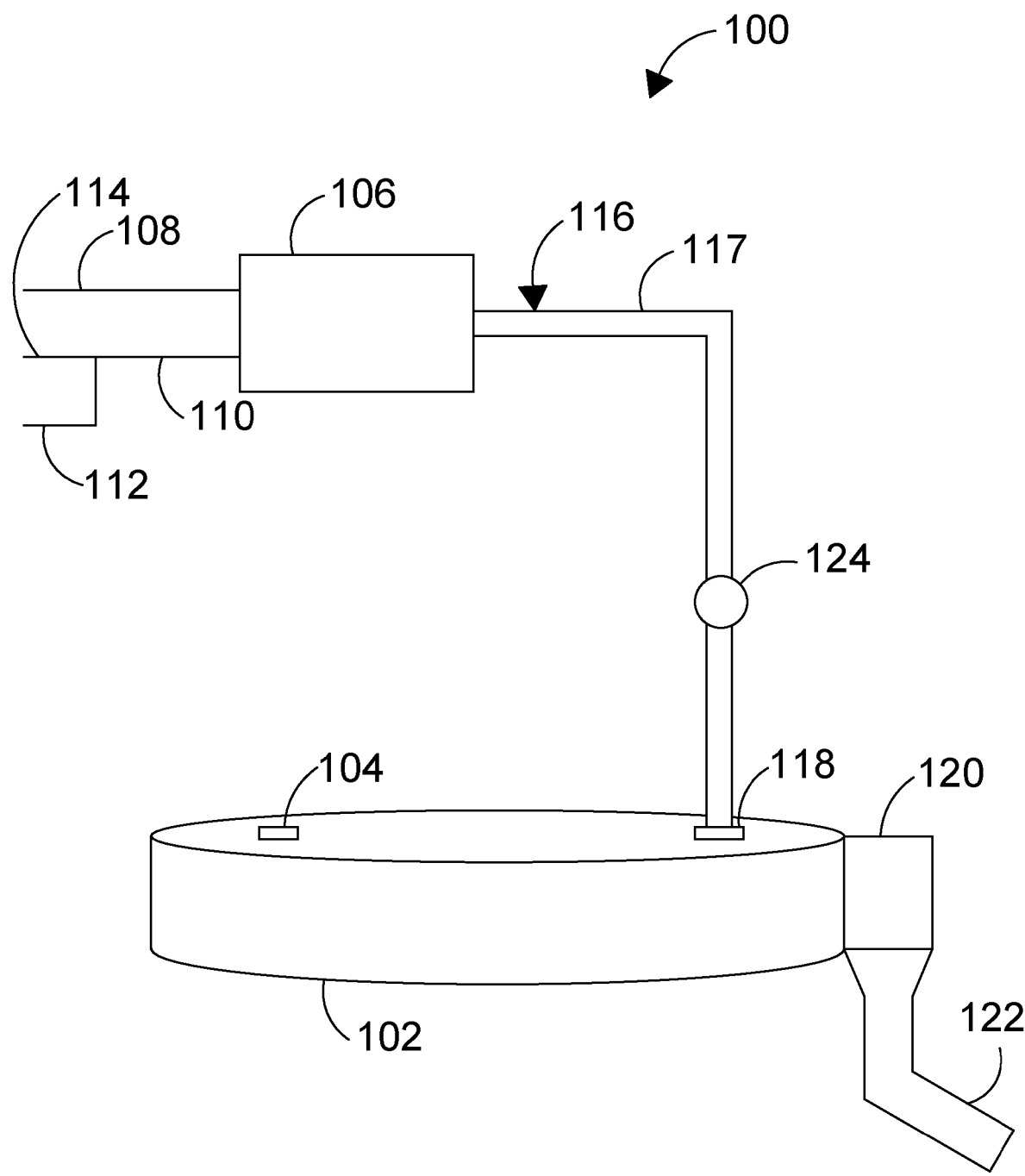
FIG. 1 is a schematic view of an apparatus in accordance with a first embodiment of present invention.

Referring to FIG. 1, there is depicted a schematic drawing of an apparatus 100 for producing a stucco slurry in accordance with a first embodiment of the present invention.

The apparatus 100 comprises a mixer 102 which is supplied with material via the material inlet 104, where the material inlet 104 is located on the upper surface of the mixer 102. In this embodiment, the material supplied to the mixer 102 is stucco which is produced from gypsum using standard gypsum calcination procedures which are well-known in the art. The mixer 102 mixes the stucco with water to produce an aqueous stucco slurry. In other embodiments, the mixer 102 may be supplied with a pre-made aqueous slurry. In the art stucco and stucco slurries are also known as gypsum plaster and gypsum plaster slurries, respectively.

The apparatus 100 further comprises a foam generator 106 for generating a foam feed 116 in the foam conduit 117. The foam feed 116 is a continuous supply of foam from the foam generator 106 supplied to the mixer 102 through the foam conduit 117. The foam generator 106 generates a foam as a foam feed 116 using air, water and surfactant supplied by the air conduit 108 and the solution conduit 110 respectively. The solution conduit 110 is supplied with surfactant by the surfactant conduit 112 and water by the water conduit 114.

The foam generator 106 produces a foam with a density between 40-150 g/L, where the density of the foam and mass flow rate of the foam feed 116 may be controlled via altering the rate at which air and/or the water-surfactant solution in introduced into the foam generator 106, and/or altering the volume fractions of the air and/or the water-surfactant solution within the foam generator 106. The air fraction of the foam is typically greater than 0.9 (90%). The foam generator 106 can produce a bubbles of different average sizes including bubbles with an average diameter of 90 microns or 300 microns.

The foam of the foam feed 116 flows from the foam generator 106 along the foam conduit 117 toward the mixer 102. The foam conduit 117 fluidly connects the foam generator 106 to the mixer 102, such that the foam of the foam feed 116 is supplied to the mixer 102 via the foam inlet 118, which is located on the upper surface of the mixer 102.

The mixer 102 mixes its aqueous stucco slurry with the foam supplied through the foam inlet 118 to produce a foamed material. That is, the foam feed 116 is incorporated into the aqueous stucco slurry by the mixer 102 to form a foamed stucco slurry, where the foamed stucco slurry has a density lower than the non-foamed stucco slurry.

The foamed stucco slurry is removed from the mixer 102 via the foamed material outlet 120 and flow along the outlet conduit 122. The material outlet 120 is located on the side of the mixer 102 to give a tangential output of foamed stucco slurry. The foamed material 120 flows from the material outlet 120 into the outlet conduit 122 which is located below the material outlet. The foamed material can then be used to produce construction materials. In this embodiment, the foamed stucco slurry is suppled to a plasterboard production line of the art by the outlet conduit 122. The foamed stucco slurry is used to produced gypsum plasterboard, where the produced gypsum plasterboard has a density lower than that produced from a non-foamed stucco slurry.

The foam of the foam feed 116 is measured by a foam mass flow meter 124. Particularly, the mass flow rate and density of this foam feed 116 are measured by the foam mass flow meter 124. The foam conduit 116 comprises a foam mass flow meter 124 which is configured such that the foam feed 116 passes through the mass flow meter 124. The foam mass flow meter 124 further comprises temperature and pressures sensors. The foam mass flow meter 124 is a Coriolis mass flow meter comprising two parallel resonating channels and a signal converter, the mass flow meter having a curved dual tubed design.

In use, the foam mass flow meter 124 measures the mass flow rate of the foam within the foam feed 116, the density of the foam within the foam feed 116, the temperature of the foam within the foam mass flow meter 124 and the pressure of the foam within the foam mass flow meter 124. Within the foam mass flow meter 124, the foam is under pressure. Therefore, as the foam is a highly compressive fluid, the foam is compressed and the density measured by the foam mass flow meter 124 is greater than that observed at atmospheric pressure. As such, if it is desirable to calculate the volume flow rate as well as the mass flow rate, the volume flow rate can be calculated using the measured temperature and pressure in the foam mass flow meter 124 to correct the measured density assuming the foam is an ideal gas. The mass flow rate is independent of pressure and, therefore, the mass flow rate measured by the foam mass flow meter 124 does not require correction.

The apparatus 100 can alternatively be used for forming other foamed plaster materials such as foamed cement plaster or foamed lime plaster.

Figure 2:
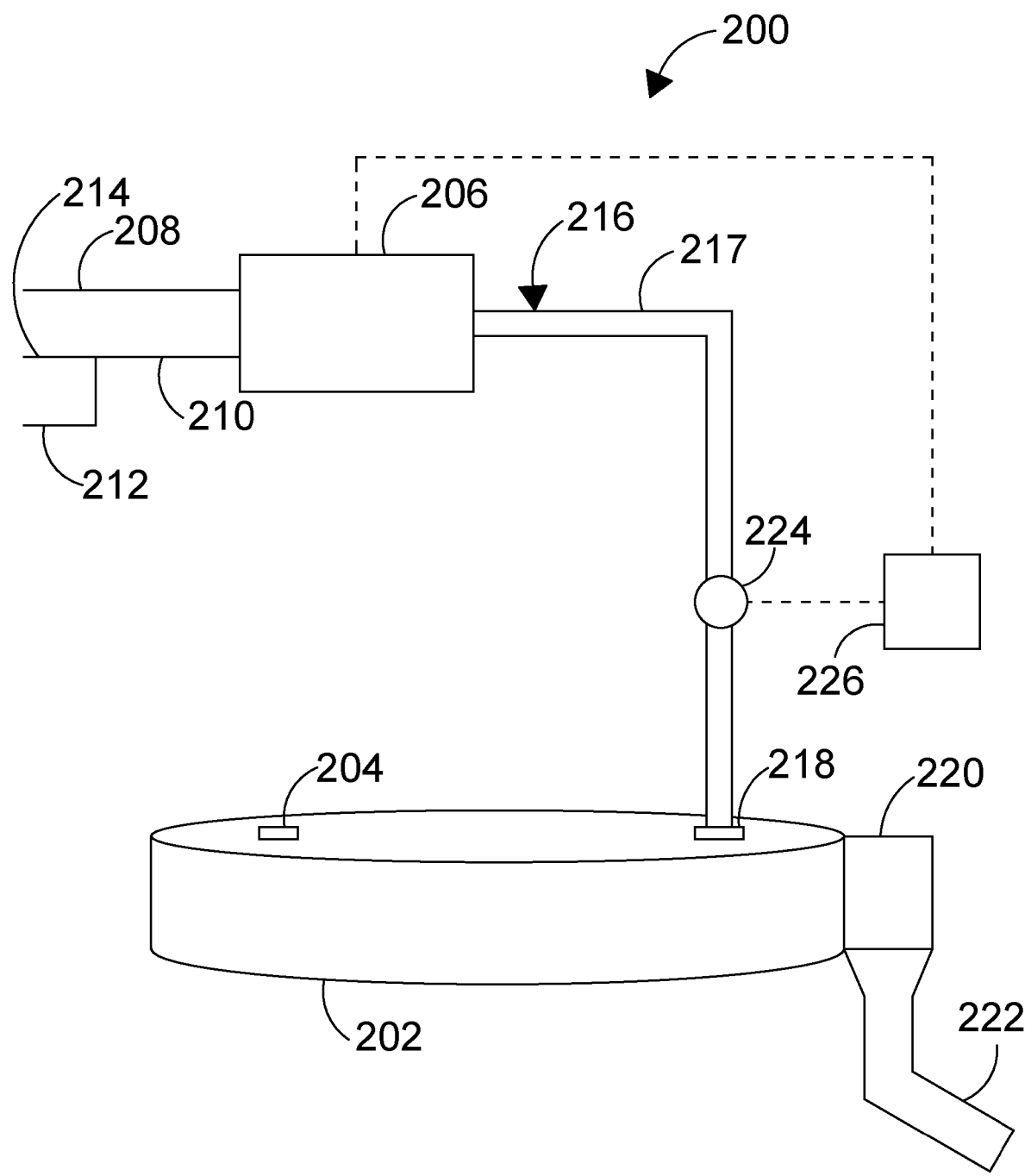
FIG. 2 is a schematic view of an apparatus in accordance with a second embodiment of present invention.

Referring to FIG. 2, there is depicted a schematic drawing of an apparatus 200 for producing a stucco slurry in accordance with a second embodiment of the present invention. The second embodiment comprises the following features which are substantially identical in structure and purpose as the equivalent features in the first embodiment: a mixer 202, a material inlet 204, a foam generator 206, an air conduit 208, a solution conduit 210, a surfactant conduit 212, a water conduit 214, a foam feed 216, a foam conduit 217, a foam inlet 218, a foamed material outlet 220, an outlet conduit 222 and a foam mass flow meter 224.

The apparatus 200 of the second embodiment differs from the first embodiment in that it further comprises a proportional-integral-derivative (PID) controller 226. The PID controller 226 is arranged to receive and analyse mass flow rate and density measurements from the foam mass flow meter 224. The PID controller 226 analyses the mass flow rate and density measurements from the foam mass flow meter 224 by comparing them to target ranges.

The PID controller 226 is connected to the foam generator 206 and can provide signals to alter the density and/or mass flow rate of the foam feed 216 produced by the foam generator 206. In this way, the PID controller 226 can control the density and mass flow rate of the foam feed 216 in the foam conduit 217 and the density and mass flow rate of the foamed material in the outlet conduit 222 such that they are maintained within their respective target ranges. Accordingly, the apparatus 200 supplies foamed material to a production processes with a consistent density.

The density and mass flow rate of the foam of the foam feed 216 is controlled by altering the rate or proportion of the air and/or water-surfactant solution supplied to the foam generator 206 by the air conduit 208 and solution conduit 210.

In essence, the PID controller 226 acts to minimise the fluctuations in density and mass flow rate of the foam feed 216 and/or foamed material using a negative feedback loop by controlling the foam generator 206 based on measurements from the foam mass flow meter 224. The aim of this negative feedback loop is to improve the consistency of the building products formed using the foamed material.

Figure 3:
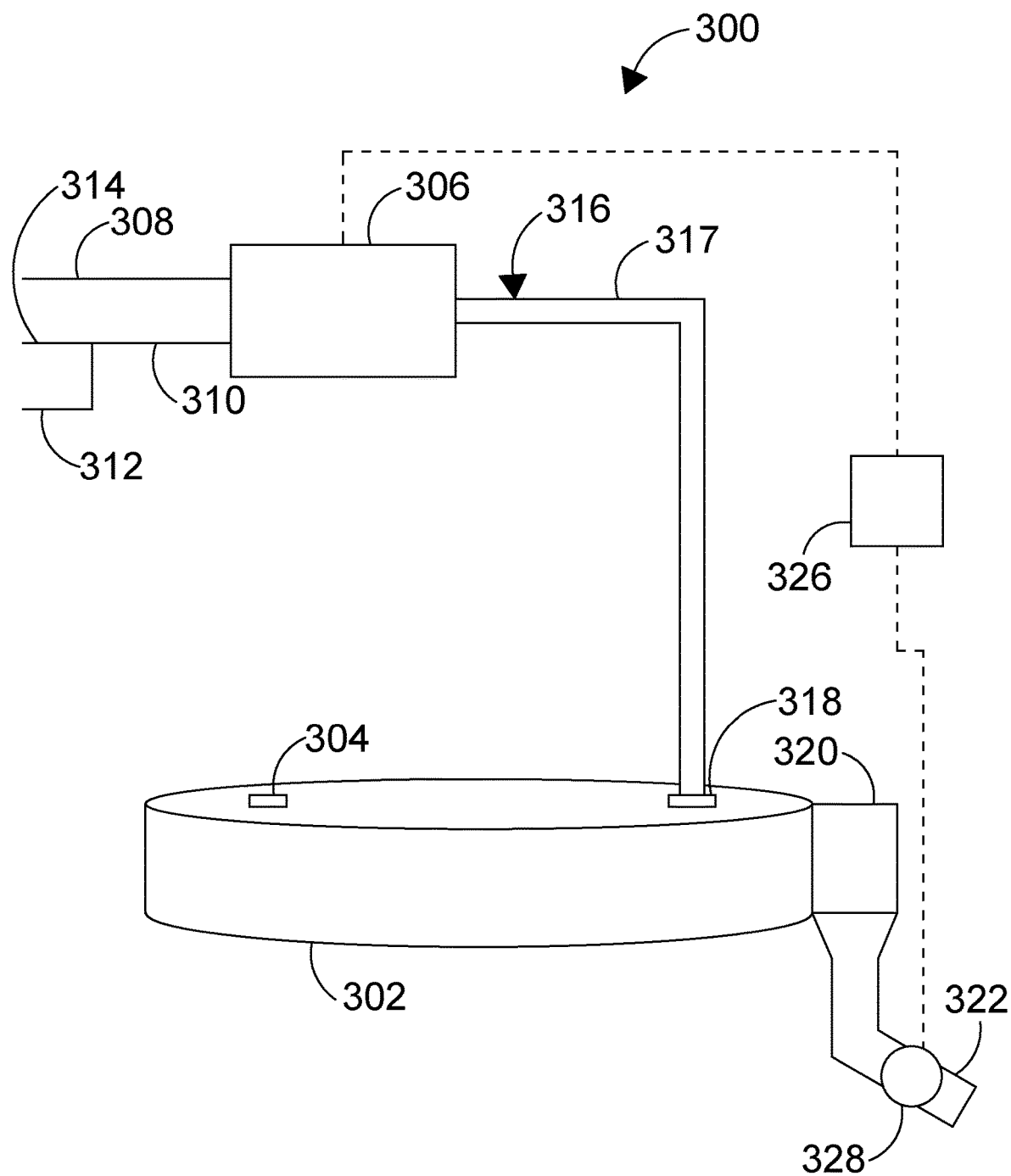
FIG. 3 is a schematic view of an apparatus in accordance with a third embodiment of present invention.

Referring to FIG. 3, there is depicted a schematic drawing of an apparatus 300 for producing a stucco slurry in accordance with a third embodiment of the present invention. The third embodiment comprises the following features which are substantially identical in structure and purpose as the equivalent features in the first embodiment: a mixer 302, a material inlet 304, a foam generator 306, an air conduit 308, a solution conduit 310, a surfactant conduit 312, a water conduit 314, a foam feed 316, a foam conduit 317, a first foam inlet 318, a foamed material outlet 320 and an outlet conduit 322.

The third embodiment differs from the first embodiment in that it comprises a material mass flow meter 328 for measuring the mass flow rate and density of the foamed stucco slurry in the outlet conduit 322 prior to the use of the foamed material for producing a product. That is, prior to using the foamed stucco slurry to form a gypsum plasterboard.

In use, the material mass flow meter 328 measures the mass flow rate of the foamed stucco slurry within the outlet conduit 322, foamed stucco slurry within the outlet conduit 322, the temperature of the foamed stucco slurry within the material mass flow meter 328 and the pressure of the foamed stucco slurry within the mass flow meter 328. Within the mass flow meter 328, the foamed stucco slurry is under pressure. Therefore, the foamed stucco slurry is compressed and the density measured by the mass flow meter 328 is greater than that observed at atmospheric pressure. As such, if it is desirable to calculate the volume flow rate as well as the mass flow rate, the volume flow rate can be calculated using the measured temperature and pressure in the mass flow meter 328 to correct the measured density. The mass flow rate is independent of pressure and, therefore, the mass flow rate measured by the mass flow meter 328 does not require correction.

The apparatus 300 of the third embodiment further differs in that it comprises a proportional-integral-derivative (PID) controller 326. The PID controller 326 is arranged to receive and analyse the flow rate and density measurements from the material mass flow meter 328. The PID controller 326 analyses the mass flow rate and density measurements from the material mass flow meter 328 by comparing them to target ranges.

The PID controller 326 is connected to the foam generator 306 and can provide signals to alter the density and/or mass flow rate of the foam feed 316 produced by the foam generator 306.

The density and mass flow rate of the foam of the foam feed 316 is controlled by altering the rate or proportion of the air and/or water-surfactant solution supplied to the foam generator 306 by the air conduit 308 and solution conduit 310.

In essence, the PID controller 326 acts to minimise the fluctuations in density and mass flow rate of the foam feed 316 and/or foamed material using a negative feedback loop by controlling the foam generator 306 based on measurements from the material mass flow meter 328. The aim of this negative feedback loop is to improve the consistency of the building products formed using the foamed material.

Figure 4:
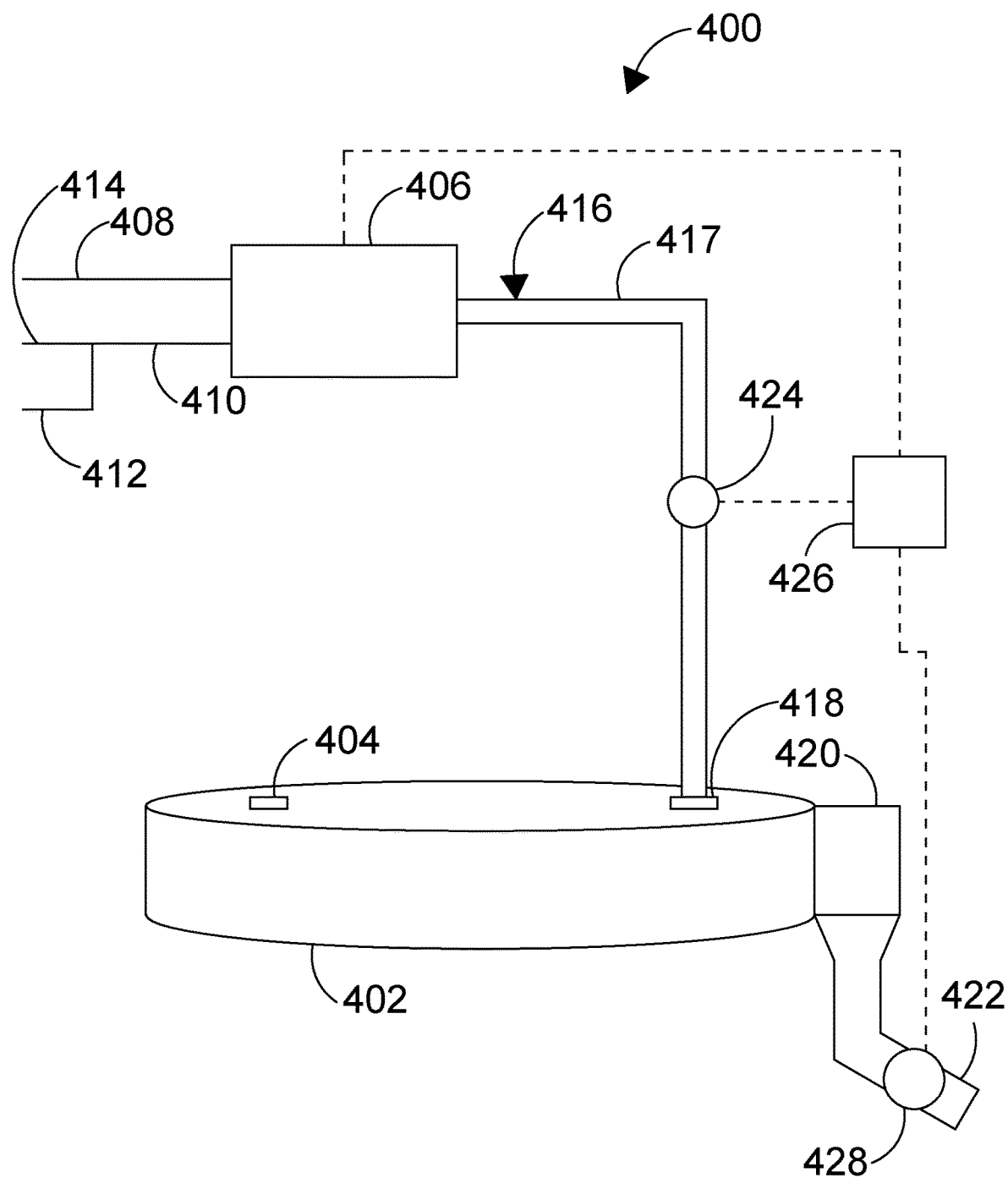
FIG. 4 is a schematic view of an apparatus in accordance with a fourth embodiment of present invention.

Referring to FIG. 4, there is depicted a schematic drawing of an apparatus 400 for producing a stucco slurry in accordance with a fourth embodiment of the present invention. The fourth embodiment comprises the following features which are substantially identical in structure and purpose as the equivalent features in the first embodiment: a mixer 402, a material inlet 404, a foam generator 406, an air conduit 408, a solution conduit 410, a surfactant conduit 412, a water conduit 414, a foam feed 416, a foam conduit 417, a first foam inlet 418, a foamed material outlet 420 and an outlet conduit 422.

The apparatus 400 of the fourth embodiment comprises a foam mass flow meter 424 and a material mass flow meter 428 connected to a single PID controller 426 in a manner analogous to the second embodiment and the third embodiment respectively. In other embodiments, the foam mass flow meter 424 and the material mass flow meter 484 are connected to separate PID controllers.

In this embodiment, the PID controller 426 uses the density and mass flow rate measurements from both the foam mass flow meter 424 and the material mass flow meter 428 in a negative feedback loop to prevent fluctuations in the density of the final product. The PID controller 426 controls the mass flow rate and density of the foam feed 416 and the foamed material in a manner similar to that described for the second embodiment and the third embodiment.

Figure 5:
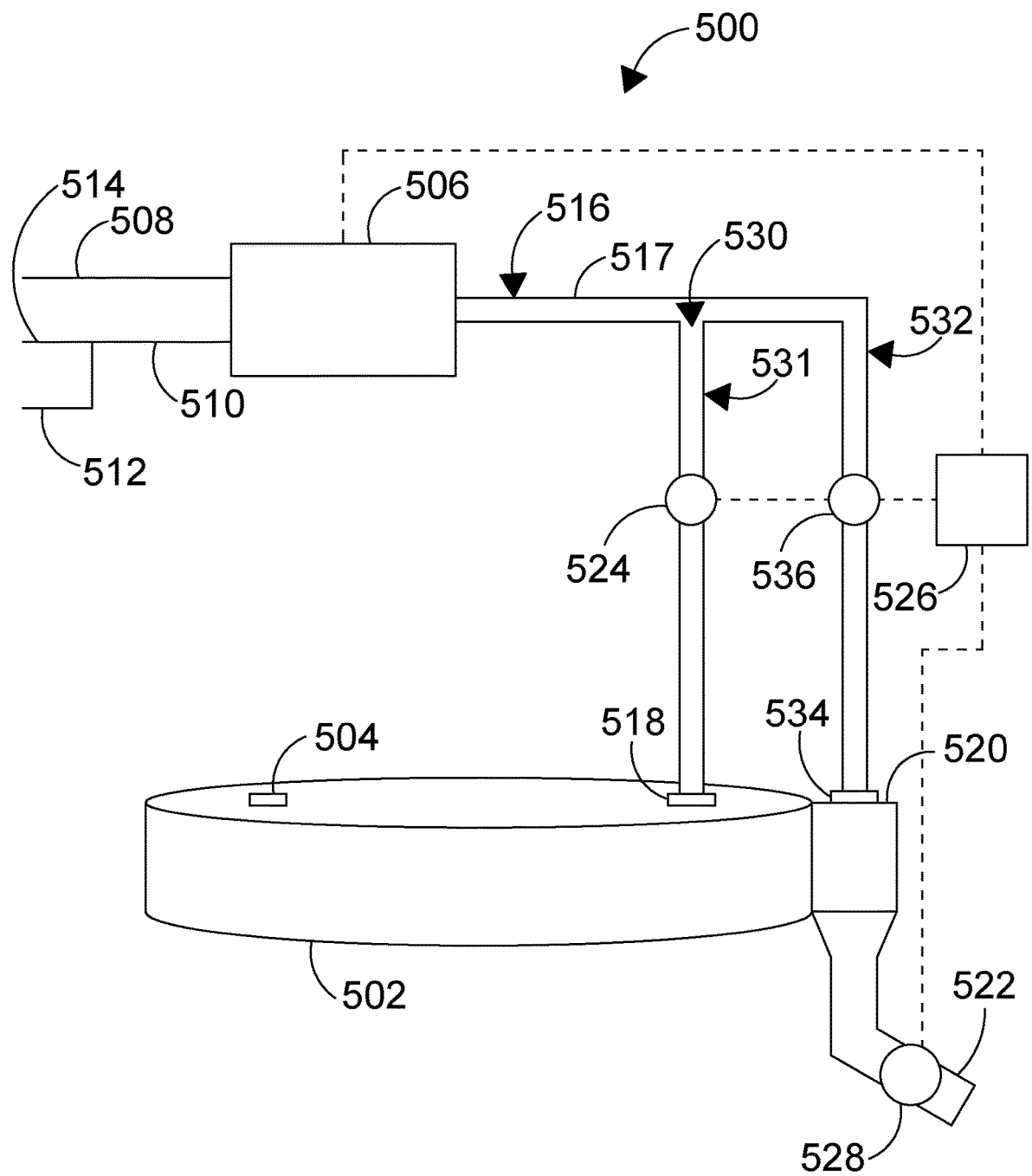
FIG. 5 is a schematic view of an apparatus in accordance with a fifth embodiment of present invention.

Referring to FIG. 5, there is depicted a schematic drawing of an apparatus 500 for producing a stucco slurry in accordance with a fifth embodiment of the present invention. The fifth embodiment comprises the following features which are substantially identical in structure and purpose as the equivalent features in the fourth embodiment: a mixer 502, a material inlet 504, a foam generator 506, an air conduit 508, a solution conduit 510, a surfactant conduit 512, a water conduit 514, a foam feed 516, a foam conduit 517, a first foam inlet 518, a foamed material outlet 520, an outlet conduit 522, a first foam mass flow meter 524, a PID controller 526 and a material mass flow meter 528.

The apparatus 500 of this embodiment differs from the fourth embodiment in that the foam conduit 517 comprises a branch point 530 which separates the foam feed 516 into a two separate foam feeds, a mixer foam feed 531 and an outlet foam feed 532.

The foam of the mixer foam feed 531 enters the mixer 502 through its top or upper surface via the first foam inlet 518 and is incorporated into the stucco slurry by the mixer 502 to produce a foamed stucco slurry similar to the first four other embodiments. The foamed stucco slurry exits the mixer 502 via the foamed material outlet 520.

The outlet foam feed is fluidly connected to the outlet foam feed and foam conduit 517 by the second foam inlet 534. The foam of the outlet foam feed 532 is then incorporated into foamed stucco slurry from the mixer 502 while the foamed stucco slurry is in the foam material outlet 520. This foamed stucco slurry, which was had the foam from both the mixer foam feed 531 and the outlet foam feed 532 incorporated into it, then enters the outlet conduit 522 ready for use in the production of a gypsum plasterboard.

The foam conduit 517 comprises two foam mass flow meters 524, 536. The first foam mass flow meter 524 is for measuring the density and mass flow rate of the mixer foam feed 531 after the branch point 530 and prior to addition to the mixer 502. The second foam mass flow meter 536 is for measuring the density and mass flow rate of the outlet foam feed 532 after the branch point 530 and prior to the material outlet 520.

Both the first foam mass flow meter 524 and the second foam mass flow meter 536 are substantially the identical in design and structure to the foam mass flow meters described for the first, second and fourth embodiments.

In essence, the apparatus 500 of the fifth embodiment involves splitting the foam feed 516 into two separate foam feeds 531, 532 and measuring the mass flow rate and density of both of the separate foam feeds 531, 532 using two different foam mass flow meters 524, 536. The first foam feed 531 is incorporated into the stucco slurry using the mixer 502 and the outlet foam feed is incorporated after mixing in the mixer 502 at the material outlet 520.

The measurements from the two foam mass flow meters 524, 536 are supplied to the PID controller 526 and compared to their respective target ranges. The PID controller 526 then controls the foam generator 506 with a negative feedback loop to limit the variation in the final product using the measurements from the foam mass flow meters 524, 536 and the material mass flow meter 528.

Additionally, the embodiment illustrated in FIG. 5 can be used to control the ratio of foam flowing through each conduit. For example, a control loop could adjust valves (such as pinch valves) on each conduit 531, 532 in response to measurements from flowmeters 524, 536 which in response to the amount of foam passing through each conduit 531, 532.

Figure 6:
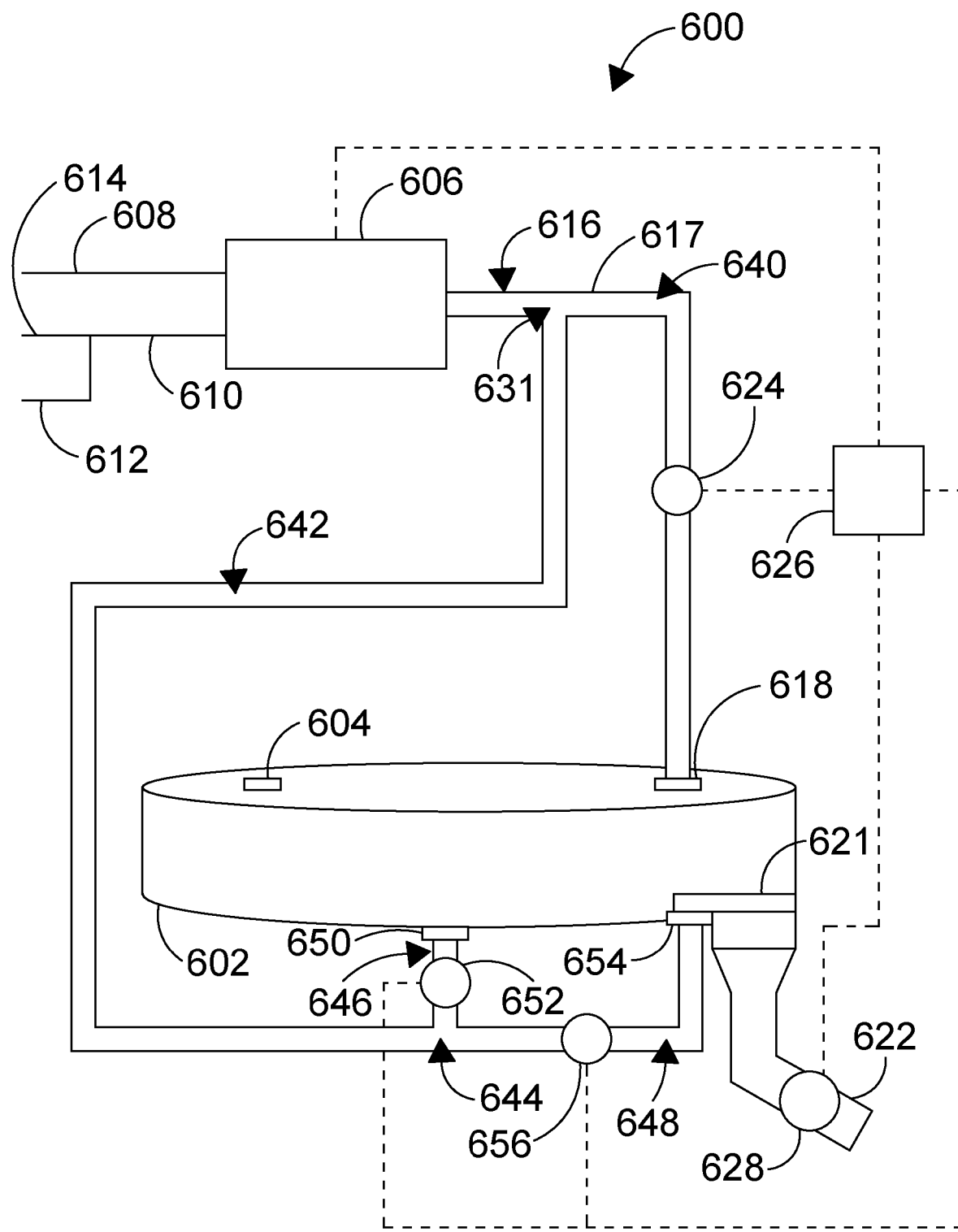
FIG. 6 is a schematic view of an apparatus in accordance with a sixth embodiment of present invention.

Referring to FIG. 6, there is depicted a schematic drawing of an apparatus 600 for producing a stucco slurry in accordance with a sixth embodiment of the present invention. The sixth embodiment comprises the following features which are substantially identical in structure and purpose as the equivalent features in the first embodiment: a mixer 602, a material inlet 604, a foam generator 606, an air conduit 608, a solution conduit 610, a surfactant conduit 612, a water conduit 614, a foam feed 616, a foam conduit 617, a first foam inlet 618, an outlet conduit 622, a PID controller 626 and a material mass flow meter 628.

The sixth embodiment comprises a mixer 602 substantially similar to previous embodiments. However, in this embodiment the material outlet 621 for the egress of foamed material from the mixer 602 is located on the lower surface or underside of the mixer 602. The outlet conduit 622 is arranged to receive the foamed stucco slurry in the top of the conduit in substantially the same manner as previous embodiments.

The foam conduit 617 of the apparatus 600 of the sixth embodiment comprises two branch points 631, 644. The first branch point 631 separates the foam feed 616 into an upper foam feed 640 and a lower foam feed 642.

The upper foam feed 640 enters the mixer 602 on its upper or top surface via the first foam inlet 618. The foam conduit 617 between the branch point 631 and the first foam inlet 618 comprises a first foam mass flow meter 624 to measure the density and mass flow rate of the foam of the upper foam feed 640.

The lower foam feed 642 proceeds under the mixer 602 in the foam conduit 617. The foam conduit 617 comprises a second branch point 644 which separates the lower foam feed 642 into a lower mixer foam feed 646 and a lower outlet foam feed 648.

The lower mixer foam feed 646 enters the mixer 602 via the second foam inlet 650. The second foam inlet 650 is located on the lower or underside of the mixer 602. The foam of the lower mixer foam feed 646 is incorporated into the stucco slurry being mixed to produce a foamed stucco slurry. The foam conduit 617 between the branch point 644 and the second foam inlet 650 comprises a second foam mass flow meter 652 which is arranged to measure the density and mass flow rate of the lower mixer foam feed 646.

The lower outlet foam feed 648 is incorporated into the foamed stucco slurry at the material outlet 621 via the third foam inlet 654. The foam conduit 617 between the branch point 644 and the third foam inlet 654 comprises a third foam mass flow meter 656 which is arranged to measure the density and mass flow rate of the lower outlet foam feed 648.

The first foam mass flow meter 624, second foam mass flow meter 652 and third foam mass flow meter 656 are substantially the same in design and structure as the foam mass flow meters described for previous embodiments.

Figure 7:
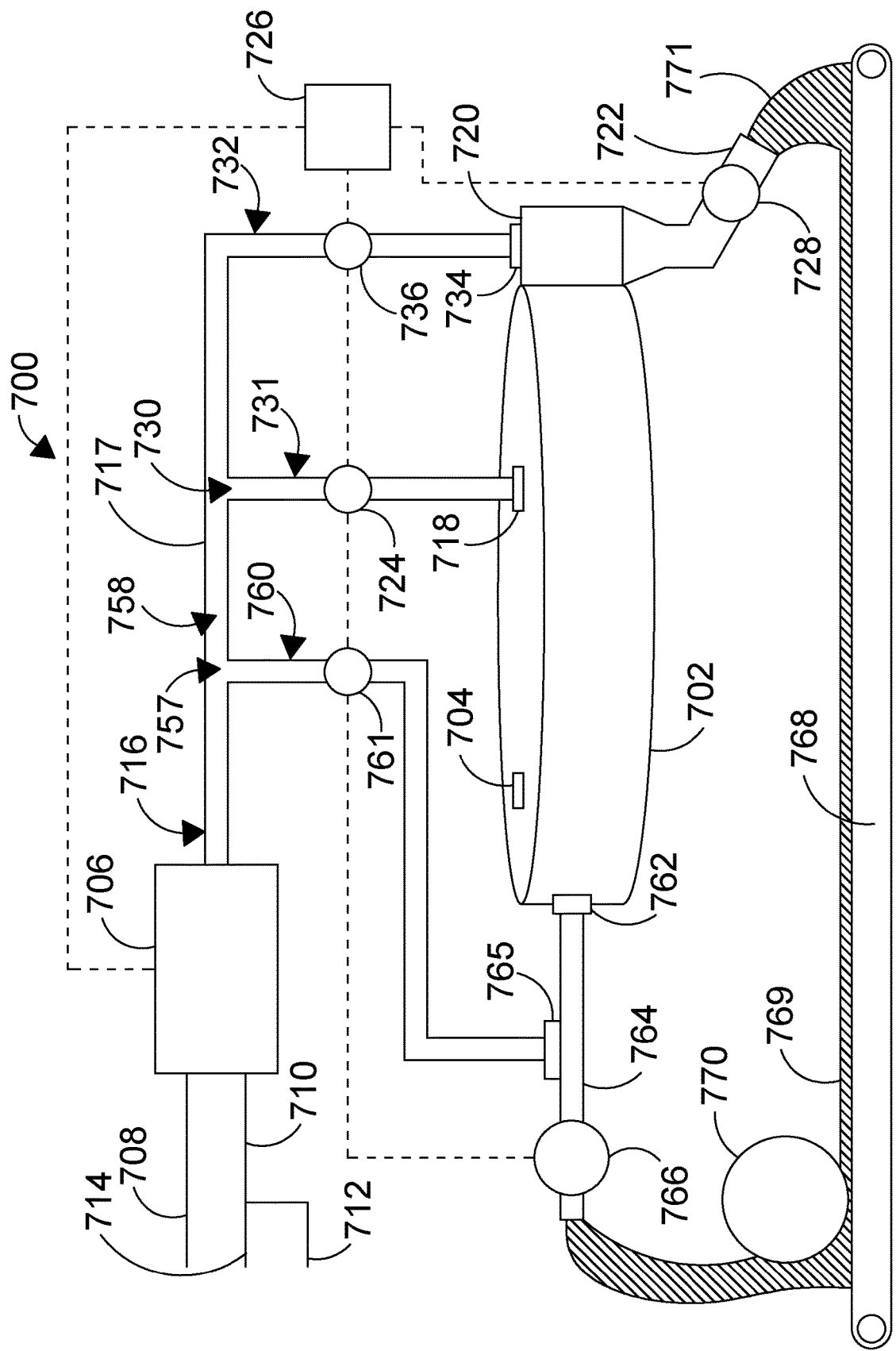
FIG. 7 is a schematic view of an apparatus in accordance with a seventh embodiment of present invention.

Referring to FIG. 7, there is depicted a schematic drawing of an apparatus 700 for producing a stucco slurry in accordance with a seventh embodiment of the present invention. The seventh embodiment comprises the following features which are substantially identical in structure and purpose as the equivalent features in the third embodiment: a mixer 702, a material inlet 704, a foam generator 706, an air conduit 708, a solution conduit 710, a surfactant conduit 712, a water conduit 714, a foam feed 716, a foam conduit 717, a first foam inlet 718, a foamed material outlet 720, an outlet conduit 722, a PID controller 726, a material mass flow meter 728, a branch point 730, a mixer foam feed 731, an outlet foam feed 732, a second foam inlet 734, a first foam mass flow meter 724 and a second foam mass flow meter 736.

The foam conduit 717 of apparatus 700 comprises a first branch point 757 to separate the foam feed 717 into a first foam feed 758 and a second foam feed 760. The first foam feed 758 supplies foam to the mixer 702 and material outlet 720 via the mixer foam feed 731 and the outlet foam feed 732 in a manner substantially similar to the fifth embodiment.

The second foam feed 760 comprises a third foam mass flow meter 761. The third foam mass flow meter 761 is for measuring the density and mass flow rate of the foam in the second foam feed 760 and is substantially the same as the foam mass flow meters described for previous embodiments.

The mixer 702 of the seventh embodiment has two points for the egress of foamed material as it comprises a second material outlet 762 in addition to the material outlet 720. The second material outlet 762 is on the opposite side of the mixer 702 to the first material outlet 720. The foamed material egressed from the second material outlet 762 enters the second material outlet conduit 764.

The foam conduit 717 directs the second foam feed 760 into the second material outlet conduit 764 via the third foam inlet 765 such that the foam of the second foam feed 760 is mixed with the foamed stucco slurry contained in the second material outlet conduit 764. The foamed stucco slurry in the second material outlet conduit 764 has a lower density after incorporation of the second foam feed 760.

The density and the mass flow rate of the foamed material in the second material outlet conduit 764 is measured by a second material mass flow meter 766, where the second material mass flow meter 766 is substantially similar to the material mass flow meters described for the previous embodiments.

In this embodiment, a first foamed stucco slurry 769 is deposited from the second material outlet conduit 764 onto a moving conveyor 768. The conveyor 768 moves the deposited first foamed stucco slurry 769 towards a roller 770. The roller 770 smooths the deposited first foamed stucco slurry 769 to be a layer of uniform thickness on top of the conveyor 768.

The conveyor 768 moves the layer of first foamed stucco slurry 769 towards the outlet conduit 722 which deposits a second layer of foamed stucco slurry 771 on top of the first. The first layer of stucco slurry 769 and the second layer of stucco slurry 771 can have different densities. In this embodiment the first foamed stucco slurry 769 has a higher density than the second foamed stucco slurry 771. In this way, it is possible to produce a gypsum plasterboard product from foamed stucco slurry layers with dense outer layers and low density core, as is well known in the art.

The PID controller 726 is connected to the first foam mass flow meter 724, a second foam mass flow meter 736, the third foam mass flow meter 761, the first material mass flow meter 728 and the second material mass flow meter 766. The PID controller 726 monitors the density and mass flow rate of all five of the mass flow meters 724, 736, 761, 728, 766 and compares their values against their respective target ranges.

That is, similar to previous embodiments, the PID controller 726 controls foam production of the foam generator 706 by altering air and solution input into foam generator 706 to control the density and/or mass flow rate of the foam feed 716 produced by the foam generator 706 is so altered. Thus, the PID controller 726 controls foam production with the aim of reducing fluctuations within the densities and mass flow rate of the mixer foam feed 731, the outlet foam feed 732, the second foam feed 760, the first foamed stucco slurry 769 and the second foamed stucco slurry 771 from their respective target ranges as measured by their respective mass flow meters. The target ranges of density for the first foamed stucco slurry 769 is typically less than the second foamed stucco slurry 771.

In this way, the PID controller 726 can control the density and properties of final product being produced from the layers of the first foamed stucco slurry 769 and the second foamed stucco slurry 771.

In essence, the PID controller 726 limits fluctuations in the density of the first and second foamed stucco slurries 769, 771 deposited on the conveyor 768 by controlling the foam generator 706 using a negative feedback loop based on the measurements of the first foam mass flow meter 724, a second foam mass flow meter 736, the third foam mass flow meter 761, the first material mass flow meter 728 and the second material mass flow meter 766.

Figure 8:
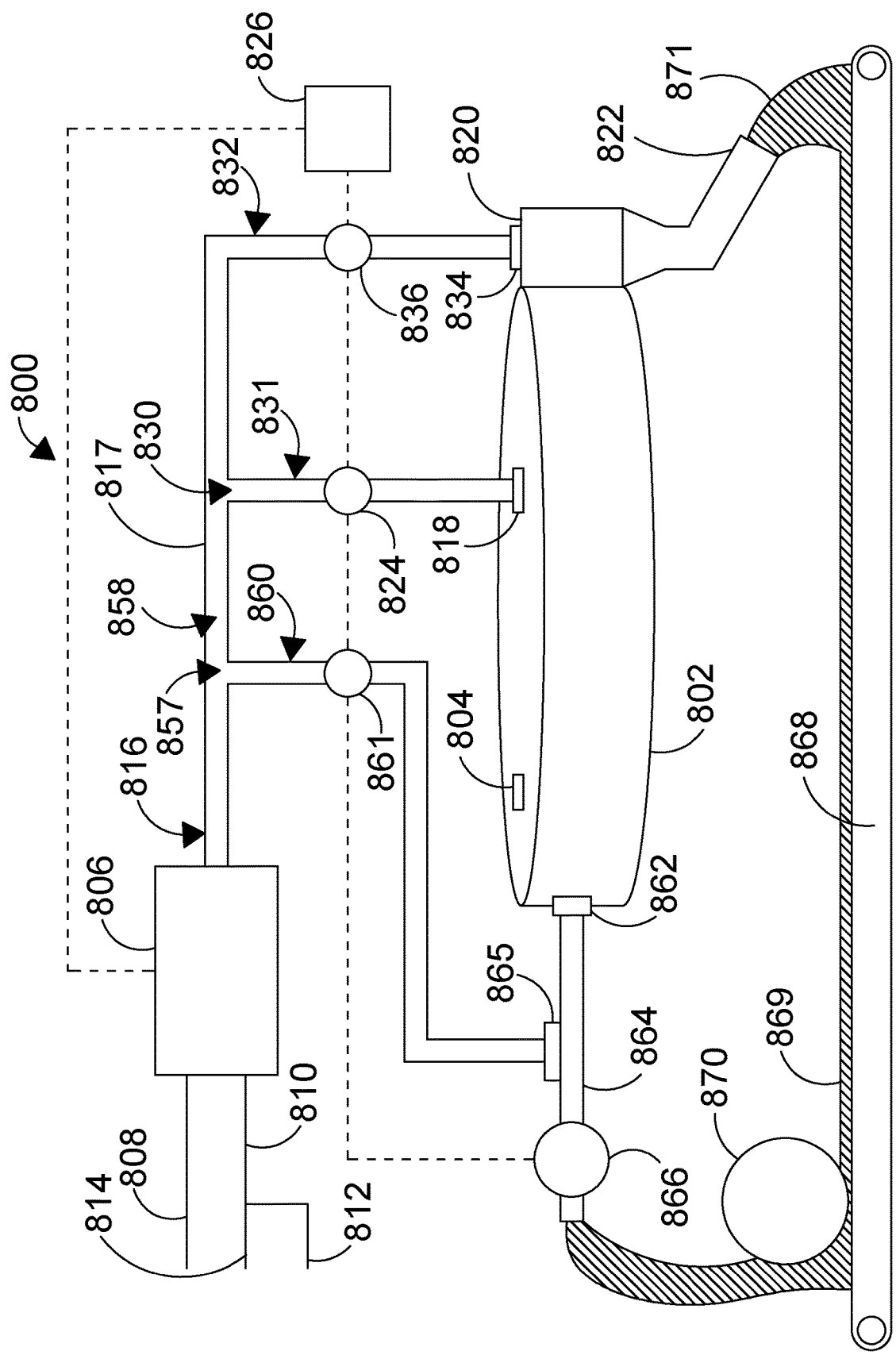
FIG. 8 is a schematic view of an apparatus in accordance with a eighth embodiment of present invention.

Referring to FIG. 8, there is depicted a schematic drawing of an apparatus 800 for producing a stucco slurry in accordance with an eighth embodiment of the present invention.

The eighth embodiment comprises the following features which are substantially identical in structure and purpose as the equivalent features in the fifth embodiment: a mixer 802, a material inlet 804, a foam generator 806, an air conduit 808, a solution conduit 810, a surfactant conduit 812, a water conduit 814, a foam feed 816, a foam conduit 817, a foam inlet 818, a foamed material outlet 820, an outlet conduit 822, a PID controller 826, a branch point 830, a mixer foam feed 831, an outlet foam feed 832, a second foam inlet 834, a first foam mass flow meter 824, a second foam mass flow meter 836, a first branch point 857, a first foam feed 858, a second foam feed 860, a third foam mass flow meter 861, a second material outlet 862, a second outlet conduit 864, a third foam inlet 865, a material mass flow meter 866, a conveyor 868, a first foamed stucco slurry 869, a roller 870 and a second foamed stucco slurry 871.

The primary difference between the seventh and the eighth embodiments is that the eighth embodiment does not comprise a second material mass flow meter (item 728 in seventh embodiment) for monitoring the density and mass flow rate of second foamed stucco slurry 871 material in the outlet conduit 822.

The PID controller 826 communicates with the first foam mass flow meter 824, a second foam mass flow meter 836, the third foam mass flow meter 861 and the material mass flow meter 866 to receive measurements and then compares each of them against their respective target ranges and alters the foam production based on these comparisons in a manner substantially similar to the seventh embodiment.

Referring to FIG. 9, there is depicted a flow diagram 900 of an example method for producing a plaster slurry in accordance with an aspect of the present invention using the apparatus 200 of the second embodiment. The method 900 is a continuous looped process.

The method begins with step 901 and comprises mixing stucco and water inside the mixer 902 to provide an aqueous plaster slurry. The stucco and water is provided to the mixer 202 by the material inlet 204. The mixer 202 comprises a foam conduit 217. The stucco is freshly produced from a gypsum calcination process as known in the art.

Step 902 happens concurrently to step 901 and comprises mixing air, water and surfactant to produce a foam in the foam generator 206. The foam generator 206 is supplied with air by the air conduit 208 and the solution of water and surfactant by the solution conduit 210. The foam generator 206 is either a static foam generator or a dynamic foam generator, as well-known in the art.

The foam generator 206 continuously generates foam to provide a foam feed 216 that flows inside of the foam conduit 217. The foam conduit 217 defines a fluid pathway between the mixer 202 and the foam generator 206 along which the foam feed 216 flows. The continuous generation of foam causes the foam feed 216 to flow along the foam conduit 217 towards the mixer 202. The density and mass flow rate of the foam feed 216 within the foam conduit is variable and is controlled by the flow rate of water and air into the foam generator 206.

Step 904 comprises measuring the density of the foam within foam feed 216 using the foam mass flow meter 224. All of the foam flowing through the foam conduit 217 flows through mass flow meter 224 and is measured by the mass flow meter 224.

Step 906, which is performed concurrently with step 904, comprises measuring the temperature of the foam of the foam feed 216 entering or exiting the foam mass flow meter 224 using the temperature sensors built into the foam mass flow meter 224.

Step 908, which is performed concurrently with step 904 and step 906, comprises measuring the pressure of foam feed 216 as it enters the foam mass flow meter 224 and measuring the pressure of foam feed 216 as it exits the foam mass flow meter 224 using the pressure sensors built into the foam mass flow meter 224. Step 908 further comprises calculating the change in pressure across the foam mass flow meter 224 using the entry and exit pressure measurements.

Step 910 comprises correcting the measured density of the foam feed 216 measured in step 904 using the temperature and pressure measurements of steps 906 and 908 and assuming the foam is an ideal gas.

Subsequently, step 912 comprises the PID controller 226 comparing the corrected density and or the measured density of the foam feed 216 against predetermined target values of the corrected and or measured density. The predetermined target values are set points that are set by the operator of the apparatus 200. The target value will vary with the requirements of, for example, the density of the final product produced from the plaster slurry.

Step 914 comprises varying the density of the foam within the foam conduit 217. The density of the foam is varied by the PID controller 226 sending a signal to the foam generator 206. In essence, the PID controller 226 controls the density of the foam within the foam feed 216 using a negative feedback loop to reduce fluctuations in the density of the foam of the foam feed 216 away from the target value/set point.

In a situation where step 912 determines that the corrected or measured density of the foam in step 910 is greater than a target value, step 914 activates step 916. Step 916 comprises the PID controller 226 providing a signal to the foam generator 206 to reduce the density of the foam of the foam feed 216. The foam generator 206 reduces the density of the foam feed 216 by doing one or both of increasing the flow rate of air and decreasing the flow rate of solution used in the generation of the foam, such that the proportion of air is increased and the proportion of solution is decreased.

Conversely, in a situation where step 912 determines that the corrected or measured density the foam 910 is less than its target value, step 914 activates step 918. Step 918 comprises the PID controller 226 providing a signal to the foam generator 206 to increase the density of the foam feed 216. The foam generator 206 increases the density of the foam feed 216 by either decreasing the flow rate of air and/or increasing the flow rate of water used in the generation of the foam, such that the proportion of air is increased and the proportion of solution is decreased.

Therefore, the method 900 comprises a negative feedback loop to limit the fluctuation of the density of the foam feed 216 compared to a predetermined target value as step 910 and step 912 adjust the density of the foam feed 216 to reduce the difference between the measured density and the target density for the foam feed 216.

Step 920 comprises supplying the foam generated by the foam generator 206 into the mixer 202. The foam conduit 217 fluidly connects the foam generator 206 and the mixer 202 such that the foam feed 216 can continuously enter the mixer 202.

Step 922 comprises mixing the foam from the foam feed 216 with the plaster slurry in the mixer 202. The mixer 202, therefore, produces a foamed plaster slurry from the foam feed 216 and the aqueous plaster slurry. This foamed plaster slurry can be used in the manufacture of gypsum plasterboards which will have a lower density than plasterboards produced from non-foamed slurries.

Subsequently, in step 924, the foamed plaster slurry is extruded from the mixer 202 via the material outlet 220 and the outlet conduit 222 ready for use in the fabrication of, for example, a gypsum plasterboard. The method 900 is a continuous looped process.

The above method could equally be used to control the mass flow rate of the foam feed 216, or the above method can control the mass flow rate and density of the foam feed 216 simultaneously.

Referring to FIG. 10, there is depicted a flow diagram 1000 of an example method for producing a plaster slurry in accordance with an aspect of the present invention using the apparatus 300 of the third embodiment.

The method begins with step 1001 and step 1002, which are identical to step 901 and step 902. Step 1001 comprises mixing at least stucco and water in a mixer 302 to provide a plaster slurry. Step 1002 comprises generating the foam feed 316 inside the foam conduit 317 from air and a solution of water and surfactant using the foam generator 306. The foam generator 306 is either a static foam generator or a dynamic foam generator, as well-known in the art.

Subsequently, step 1004 involves supplying the mixer 302 with foam from the foam feed 316, in a manner substantially similar to step 920. Then, step 1006 comprises mixing the plaster slurry and the foam feed 316 together to provide a foamed plaster slurry in a manner substantially similar to step 922.

Next, step 1008 comprises exiting the foamed plaster slurry produced in step 1006 from the mixer 302 via the material outlet 320 and the outlet conduit 322. When the foamed plaster slurry is inside of outlet 322 it passes through the material mass flow meter 328. Step 1010 comprises measuring the density of the foamed plaster slurry within the outlet conduit 322 using the material mass flow meter 328. All of the foamed plaster slurry extruded from the mixer 1002 is measured by the material mass flow meter 328.

Step 1012, which is performed concurrently with step 1010, comprises measuring the temperature of the foam of the foamed plaster slurry entering or exiting the material mass flow meter 328 using the temperature sensors built into the material mass flow meter 328.

Step 1014, which is performed concurrently with step 1010 and step 1012, comprises measuring the pressure of the foamed plaster slurry feed as it enters and exits the material mass flow meter 328 and calculating the change in pressure using the pressure sensors built into the material mass flow meter 328.

Next, step 1016 comprises correcting the measured density of the foamed plaster slurry measured in step 1010 using the temperature and pressure measurements of steps 1012 and 1014.

Subsequently, step 1018 comprises the PID controller 326 comparing the corrected density and or measured density of the foamed plaster slurry feed against predetermined target values of the corrected and or measured density. The predetermined target values are set points that are set by the operator of the apparatus 300. The target value will vary with the requirements of, for example, the density of the final product produced from the foamed plaster slurry.

Step 1020 comprises varying the density of the foam of the foam feed 316 within the foam conduit 317. The density of the foam is varied by the PID controller 326 sending a signal to the foam generator 306. In essence, the PID controller 326 controls the density of the foam within the foam feed 316 using a negative feedback loop to reduce fluctuations in the density of the foamed plaster slurry away from the target value/set point.

In a situation where step 1018 determines that the corrected and or measured density of the foamed plaster slurry is greater than its target value, step 1020 activates step 1022. Step 1022 comprises the PID controller 326 providing a signal to the foam generator 306 to reduce the density of the foam of the foam feed 316. The foam generator 306 reduces the density of the foam feed 316 by either increasing the flow rate of air and or decreasing the flow rate of solution used in the generation of the foam, such that the proportion of air is increased and the proportion of solution is decreased.

Conversely, in a situation where step 1018 determines that the corrected or measured density the foamed plaster slurry is less than its target value, step 1020 activates step 1024. Step 1024 comprises the PID controller 326 providing a signal to the foam generator 306 to increase the density of the foam feed 316. The foam generator 306 increases the density of the foam feed 316 by either decreasing the flow rate of air and or increasing the flow rate of water used in the generation of the foam, such that the proportion of air is decreased and the proportion of solution is increased.

Therefore, the method 1000 comprises a negative feedback loop to limit the fluctuation of the density of foamed plaster slurry compared to a predetermined target value as step 1022 and step 1024 adjust the density of the foam feed 318 to reduce the difference between the measured and the target value of density for the foamed plaster slurry.

Either step 1022 or step 1024 then begins the process 1000 again as method 1000 is a continuous looped process.

Referring to FIG. 11, there is depicted a flow diagram 1100 of an example method for producing a plaster slurry in accordance with an aspect of the present invention using the apparatus 400 of the fourth embodiment.

The PID controller 426 of the apparatus 400 is connected to both the foam mass flow meter 424 and the material mass flow meter 428. Therefore, the apparatus 400 can perform either the method 900 or the method 1000. In addition, the apparatus 400 can perform a further method, method 1100, which is effectively a combination of the method 900 and the method 1000.

Method 1100 begins with step 1101, step 1102, step 1104, step 1106 and step 1108 which are substantially the same as step 1001, step 1002, step 1004, step 1006 and step 1008, respectively.

Subsequently, step 1110 is performed which is substantially the same as the combination of step 1010 and step 904 and produces density measurements of foam feed 416 in the foam conduit 417 and the foamed plaster slurry in the outlet conduit 422 using the foam mass flow meter 424 and the material mass flow meter 484, respectively.

Next, step 1112 comprises a combination of step 1012 and step 906, and then step 1114 comprises a combination of step 1014 and 908. Thus, step 1112 and step 1114 produce temperature and pressure measurements such that step 1116 can correct the density measurements of step 1110.

Then, step 1118 compares the corrected or measured density of the foam against a target value and compares the corrected or measured density of the foamed plaster slurry against a different target value. That is, both the corrected and or measured density of the foam and the corrected and or measured density of the foamed plaster slurry are compared against separate target values.

Next, in step 1120, the method 1100 varies the density of foam within the foam conduit 417 to reduce the difference between the density measured by the foam mass flow meter 424 and its target value, and to reduce the difference between the between the density measured by the material mass flow meter 428 and its target value. The target values can be ranges of values.

Method 1100 finishes with step 1122 which is substantially the same as steps 916 and 1022, and step 1124 which is substantially the same as steps 918 and 1024.

All embodiments of the present invention can comprise a PID controller to minimise fluctuations of the outputted of the foamed materials using a negative feedback loop. In these envisaged embodiments, the PID controller is the controller of the negative feedback loop and is connected to the foam mass flow meter sensors or the material mass flow meters. The PID controller controls the foam feeds through the foam generator. The foam generator is controlled by the PID controller by altering the proportions of air and solution used in the production of foam. This control is performed to limit fluctuations in the densities and/or mass flow rate as detected by the mass flow meters. In further envisaged embodiments, the PID controller receives inputs from multiple mass flow meters and attempts to balance and minimise fluctuations for the multiple mass flow meters.

Aspects, embodiment and features of the present invention are also set out in the following clauses.

1. An apparatus for the production of a plaster slurry, said apparatus comprising; a mixer for mixing at least plaster and water to form a plaster slurry, said mixer comprising an outlet conduit;
   a foam generator for mixing at least air, a foaming agent and water to produce a foam,
   said foam generator in fluid communication with said mixer via a fluid pathway comprising a foam conduit; and
   a mass flow meter,
   said mass flow meter configured to measure the density and mass flow rate of:
   said foam within said foam conduit, or
   said plaster slurry within said outlet conduit.
2. The apparatus of clause 1, wherein said foam conduit extends between said foam generator and said mixer.
3. The apparatus of clause 1, wherein said foam conduit extends between said foam generator and said outlet conduit.
4. The apparatus of clause 3, wherein said mass flow meter is positioned downstream of said foam conduit.
5. The apparatus of any one preceding clause, wherein said apparatus further comprises a control system configured to vary the mass flow rate or density of the foam within said foam conduit.
6. The apparatus of clause 5, wherein said control system is configured to increase the air within said foam generator, or decrease the water within said foam generator, or increase the air within said foam generator and decrease the water within said foam generator, if said measured density is above a target density.
7. The apparatus of clause 5 or clause 6, wherein said control system is configured to decrease the air within said foam generator, or increase the water within said foam generator, or decrease the air within said foam generator and increase the water within said foam generator, if said measured density is below a target density.
8. The apparatus of any one of clauses 5 to 7, wherein the apparatus further comprises at least one sensor configured to measure the temperature of the material entering or exiting said mass flow meter.

9. The apparatus of any one of clauses 5 to 8, wherein said apparatus further comprises at least one sensor configured to measure the pressure at the entrance and or exit of said mass flow meter.

10. The apparatus of clause 8 or clause 9, wherein said control system is configured to correct the measured density using at least one sensor measurement.

11. The apparatus of any one preceding clause, wherein said mass flow meter comprises two parallel resonating channels and a signal converter, where said mass flow meter has a curved dual tube design.

12. The apparatus of any one preceding clause, wherein said apparatus comprises at least two mass flow meters, a first mass flow meter configured to measure the density and mass flow rate of said foam within said foam conduit and a second mass flow meter configured to measure the density and mass flow rate of said plaster slurry within said outlet conduit.

13. The apparatus of any one of clauses 1 to 11, wherein said foam generator is in fluid communication with said mixer via a plurality of fluid pathways, each fluid pathway comprising a foam conduit, and said apparatus further comprises at least two mass flow meters, each mass flow meter configured to measure the density and mass flow rate of said foam within a different foam conduit.

14. The apparatus of any one of clauses 1 to 11, wherein said apparatus comprises a plurality of outlet conduits, said apparatus further comprising at least two mass flow meters, each mass flow meter configured to measure the density and mass flow rate of said plaster slurry within a different outlet conduit.

15. A method for manufacturing a plaster slurry, said method comprising;
mixing materials comprising at least plaster and water to form a plaster slurry in a mixer comprising a conduit;
mixing at least air, a foaming agent and water to produce a foam in a foam generator,
said foam generator in fluid communication with said mixer via a fluid pathway comprising a foam conduit, and
measuring the density and mass flow rate of said foam within said foam conduit or said gypsum slurry within said outlet conduit using a mass flow meter 16. Computer implemented method for controlling an apparatus according to any of clauses 1 to 14.

17. At least one non-transitory computer readable storage medium comprising instructions, that when executed on a computing device cause the computing to control an apparatus according to any of clauses 1 to 14.

The invention claimed is:

1. An apparatus for the production of a plaster slurry, said apparatus comprising:
a mixer for mixing at least plaster and water to form a plaster slurry, said mixer comprising an outlet conduit;
a foam generator for mixing at least air, a foaming agent and water to produce a foam, said foam generator in fluid communication with said mixer via a fluid pathway comprising a foam conduit;
a mass flow meter, and
a control system configured to vary the density of said foam within said foam conduit or said plaster slurry within said outlet conduit;
said mass flow meter configured to measure the density and mass flow rate of:
said foam within said foam conduit, or
said plaster slurry within said outlet conduit, and
wherein the apparatus further comprises at least one sensor configured to measure the pressure at the entrance and/or exit of said mass flow meter, and
characterised in that said control system is configured to correct the measured density using a measurement from the at least one sensor.

2. The apparatus of claim 1, wherein said foam conduit extends between said foam generator and said mixer.

3. The apparatus of claim 1, wherein said foam conduit extends between said foam generator and said outlet conduit.

4. The apparatus of claim 3, wherein said mass flow meter is positioned downstream of said foam conduit.

5. The apparatus of claim 1, wherein said control system is configured to increase the air within said foam generator, or decrease the water within said foam generator, or increase the air within said foam generator and decrease the water within said foam generator, if said measured density is above a target density.

6. The apparatus of claim 5, wherein said target density is a range of density values.

7. The apparatus of claim 1, wherein said control system is configured to decrease the air within said foam generator, or increase the water within said foam generator, or decrease the air within said foam generator and increase the water within said foam generator, if said measured density is below a target density.

8. The apparatus of claim 7, wherein said target density is a range of density values.

9. The apparatus of claim 1, wherein the apparatus further comprises at least one sensor configured to measure the temperature of the material entering or exiting said mass flow meter.

10. The apparatus of claim 1, wherein said mass flow meter comprises two parallel resonating channels and a signal converter, where said mass flow meter has a curved dual tube design.

11. The apparatus of claim 1, wherein said apparatus comprises at least two mass flow meters, a first mass flow meter configured to measure the density and mass flow rate of said foam within said foam conduit and a second mass flow meter configured to measure the density and mass flow rate of said plaster slurry within said outlet conduit.

12. The apparatus of claim 1, wherein said foam generator is in fluid communication with said mixer via a plurality of fluid pathways, each fluid pathway comprising a foam conduit, and said apparatus further comprises at least two mass flow meters, each mass flow meter configured to measure the density and mass flow rate of said foam within a different foam conduit.

13. The apparatus of claim 1, wherein said apparatus comprises a plurality of outlet conduits, said apparatus further comprising at least two mass flow meters, each mass flow meter configured to measure the density and mass flow rate of said plaster slurry within a different outlet conduit.

14. A method for manufacturing a plaster slurry using the apparatus of claim 1, said method comprising:
mixing materials comprising at least plaster and water to form said plaster slurry in said mixer;
mixing at least air, said foaming agent and water to produce said foam in said foam generator,
measuring the density and mass flow rate of said foam within said foam conduit or said gypsum slurry within said outlet conduit using said mass flow meter,
measuring the pressure at the entrance and/or exit of said mass flow meter, and characterised in that the method further comprises the step of
correcting the measured density using the measurement from the at least one sensor.

15. The apparatus of claim 1, wherein said mass flow meter is configured to continuously measure the density and mass flow rate of:
said foam within said foam conduit; or
said plaster slurry within said outlet conduit.

16. The apparatus of claim 1, wherein said control system is configured to correct said measured density assuming said foam is an ideal gas.

17. The apparatus of claim 1, wherein said apparatus comprises a pair of pressure sensors.

18. The apparatus of claim 1, wherein said control system comprises a proportional-integral-derivative controller.

19. The apparatus of claim 1, wherein said apparatus is configured to use the corrected measured density to calculate a volume flow rate.

20. The apparatus of claim 1, wherein said foam conduit is split into multiple conduits and wherein each foam conduit comprises a foam flow meter in combination with a valve, wherein said valve is configured to control the amount of foam flowing through each foam conduit.

21. The apparatus of claim 1, wherein said control system is configured to vary the mass flow rate of said foam within said foam conduit.

\* \* \* \* \*